US011541338B2

(12) United States Patent  
Kitajima et al.

(10) Patent No.: US 11,541,338 B2  
(45) Date of Patent: Jan. 3, 2023

(54) FILTER DEVICE

(71) Applicant: YAMASHIN-FILTER CORP., Kanagawa (JP)

(72) Inventors: Nobuyuki Kitajima, Kanagawa (JP); Mitsuhiro Yamaguchi, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 232 days.

(21) Appl. No.: 16/840,507

(22) Filed: Apr. 6, 2020

(65) Prior Publication Data

US 2020/0230529 A1 Jul. 23, 2020

Related U.S. Application Data

(63) Continuation of application No. PCT/JP2018/041939, filed on Nov. 13, 2018.

(30) Foreign Application Priority Data

Nov. 17, 2017 (JP) .............................. JP2017-222304  
Nov. 20, 2017 (JP) .............................. JP2017-223198  
Aug. 13, 2018 (JP) .............................. JP2018-152458

(51) Int. Cl.  
*B01D 35/30* (2006.01)  
*B01D 29/15* (2006.01)  
(Continued)

(52) U.S. Cl.  
CPC ......... *B01D 35/306* (2013.01); *B01D 27/106* (2013.01); *B01D 29/15* (2013.01);  
(Continued)

(58) Field of Classification Search  
CPC .............. B01D 35/027; B01D 35/0276; B01D 35/1475; B01D 35/1573  
See application file for complete search history.

(56) References Cited

U.S. PATENT DOCUMENTS 8,216,467 B2 * 7/2012 Lauer .................. B01D 29/902  
210/240  
10,525,386 B2 * 1/2020 Oshita ................. B01D 35/147  
(Continued)

FOREIGN PATENT DOCUMENTS

CN 1756582 A 4/2006  
CN 101472623 A 7/2009  
(Continued)

OTHER PUBLICATIONS

International Search Report issued in PCT/JP2018/041939 dated Jan. 22, 2019 with English Translation (4 pages).  
Extended European Search Report issued in European Patent Application No. 18878564.6, dated Nov. 16, 2020 (8 pages).  
(Continued)

*Primary Examiner* — Benjamin M Kurtz  
(74) *Attorney, Agent, or Firm* — Nakanishi IP Associates, LLC

(57) ABSTRACT

A backflow of liquid inside a filter device during an operation of an internal combustion engine is allowed to be obviated while air inside the filter device is purged so as not to generate bubbles in the liquid. An outflow portion that includes a cylindrical portion having a substantially bottomed cylindrical shape and a back pressure valve provided inside the cylindrical portion is provided so as to penetrate a bottom surface of a case. In addition, a lid body provided on the case and an upper plate of a filter element so as to cover an upper end of the case has a first hole that communicates between a space inside the case and a space outside the case. When the back pressure valve opens (a valve body does not abut on a first valve seat), a space inside the filter element communicates with the space outside the case via a second through-hole formed in a side surface of the cylindrical portion.

15 Claims, 14 Drawing Sheets

(51) Int. Cl.
   *B01D 29/60* (2006.01)
   *B01D 35/027* (2006.01)
   *B01D 27/10* (2006.01)

(52) U.S. Cl.
   CPC ......... *B01D 29/608* (2013.01); *B01D 35/027* (2013.01); *B01D 2201/0415* (2013.01); *B01D 2201/0446* (2013.01); *B01D 2201/0461* (2013.01); *B01D 2201/167* (2013.01); *B01D 2201/301* (2013.01)

(56) References Cited

U.S. PATENT DOCUMENTS

| | | |
|---|---|---|
| 2009/0057213 A1 | 3/2009 | Schiavon et al. |
| 2009/0314697 A1 | 12/2009 | Ardes |
| 2010/0219113 A1 | 9/2010 | Giarelli |
| 2012/0145625 A1 | 6/2012 | Schiavon et al. |
| 2015/0246304 A1 | 9/2015 | Moessinger et al. |
| 2018/0147511 A1 | 5/2018 | Kitajima et al. |
| 2020/0016519 A1* | 1/2020 | Ishizuka ............. B01D 35/153 |

FOREIGN PATENT DOCUMENTS

| | | | |
|---|---|---|---|
| CN | 104048080 | A | 9/2014 |
| CN | 104168973 | A | 11/2014 |
| CN | 204671971 | U | 9/2015 |
| CN | 106413838 | A | 2/2017 |
| CN | 106861278 | A | 6/2017 |
| CN | 107614895 | A | 1/2018 |
| JP | 16-327909 | A | 11/1994 |
| JP | 2009-536088 | A | 10/2009 |
| JP | 2014-188430 | A | 10/2014 |
| JP | 2017-80716 | * | 5/2017 |
| KR | 101691556 | B1 | 1/2017 |
| WO | 2005/063358 | A | 7/2005 |
| WO | 2011/050872 | A1 | 5/2011 |
| WO | 2015086996 | A1 | 6/2015 |
| WO | 2018/036716 | A1 | 3/2018 |
| WO | 2018/139273 | A1 | 8/2018 |

OTHER PUBLICATIONS

Office Action issued in Chinese Patent Application No. 201880049619.8 dated Mar. 11, 2021 (11 pages).

* cited by examiner

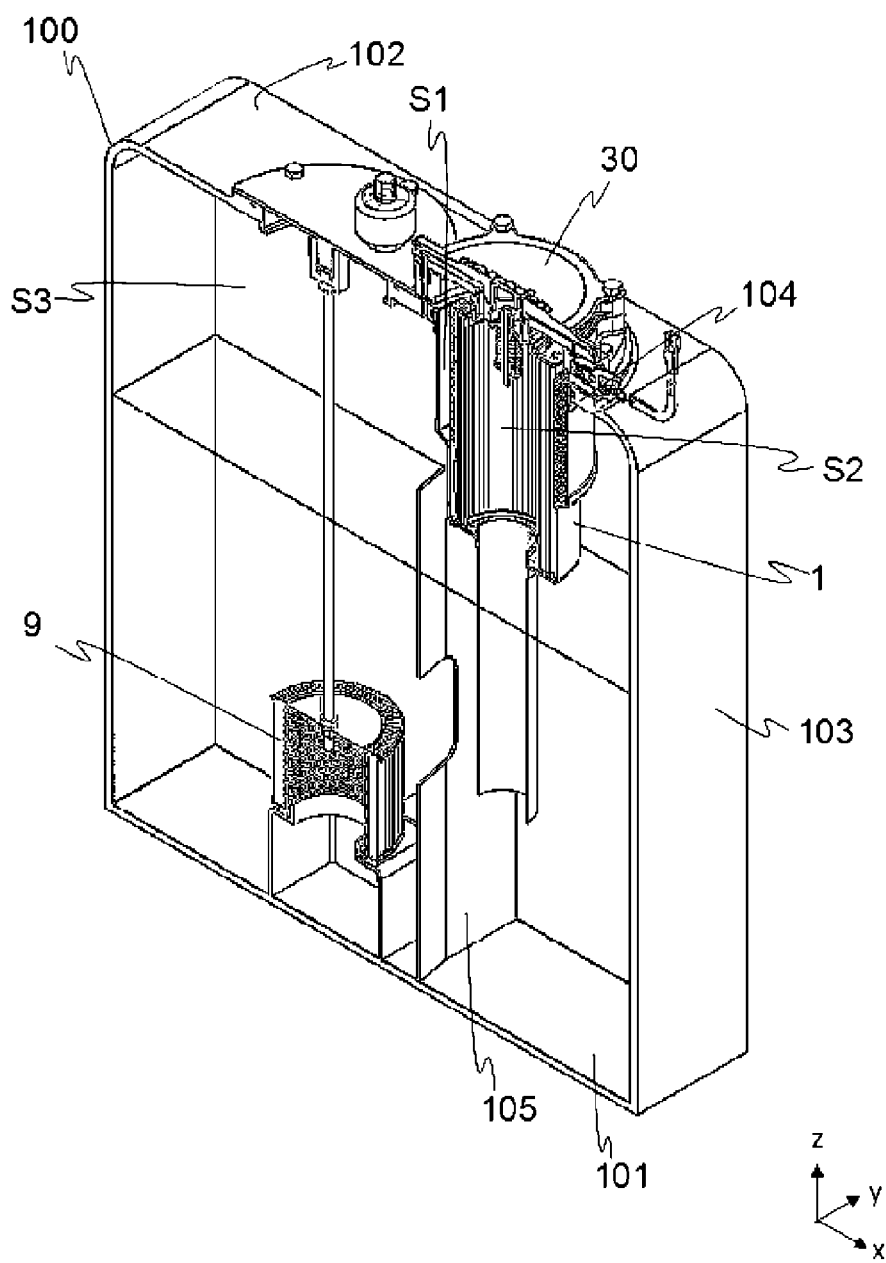
FIG. 1

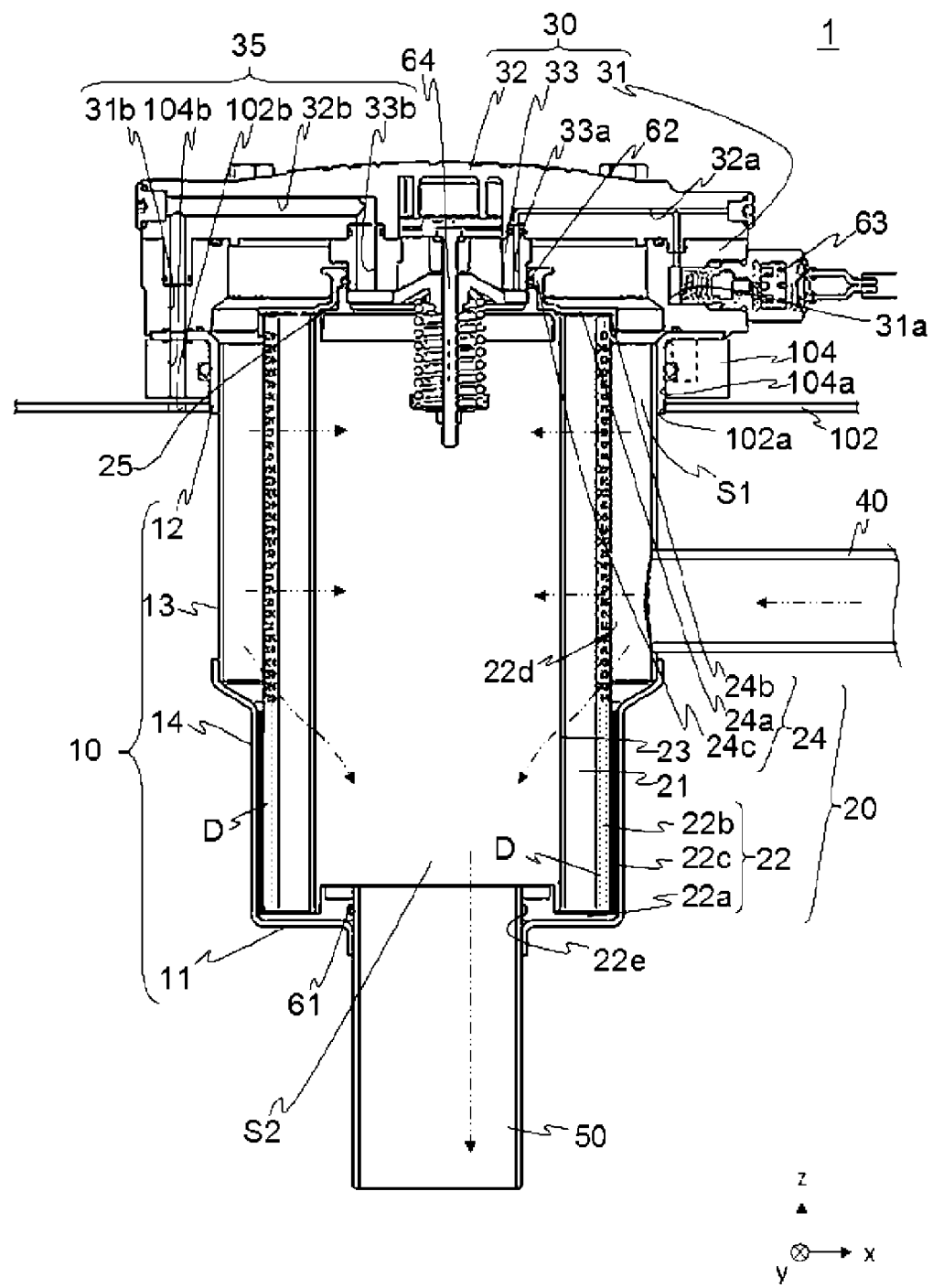
FIG. 2

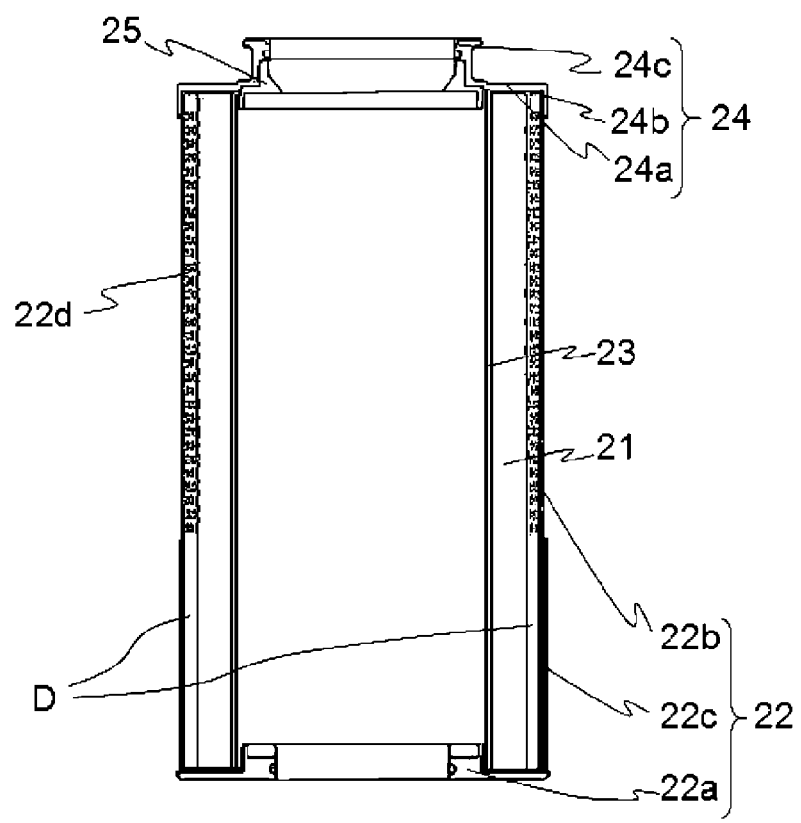
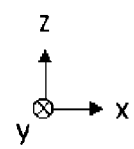
FIG. 3

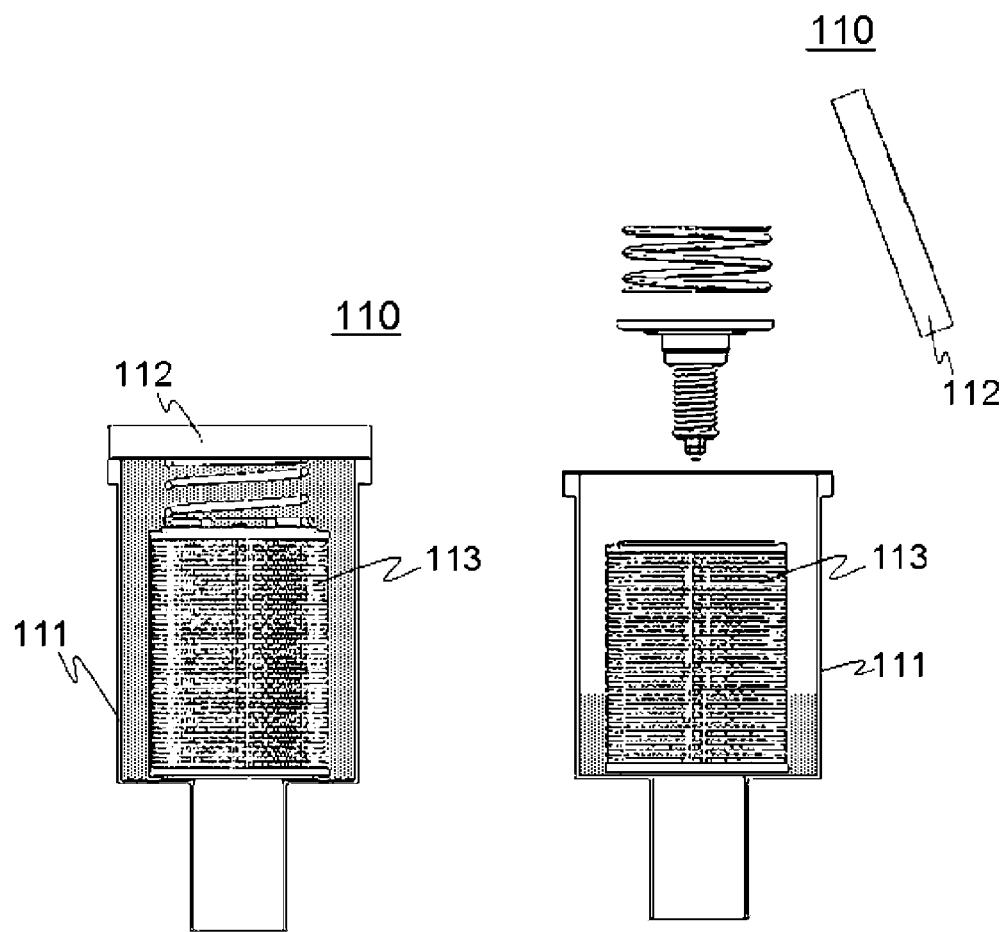
Prior Art
FIG. 4A
Prior Art
FIG. 4B

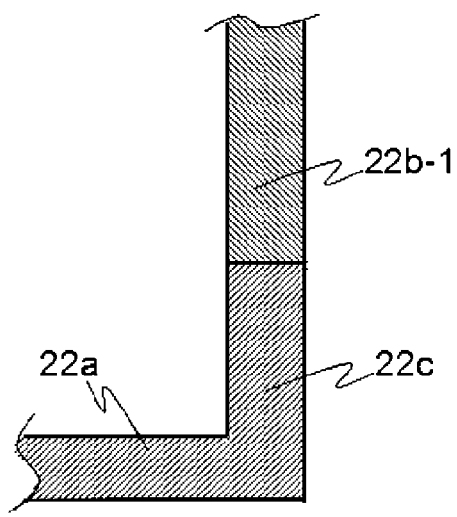
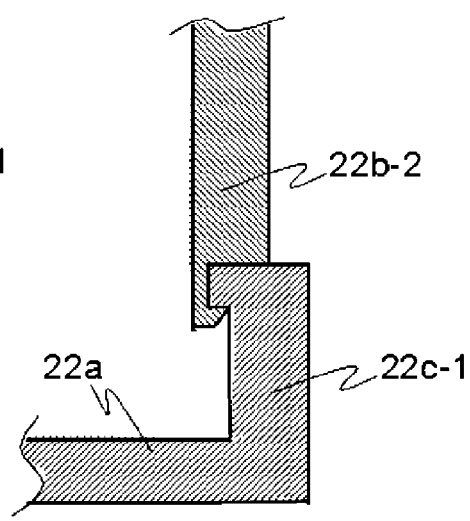
FIG. 5A    FIG. 5B

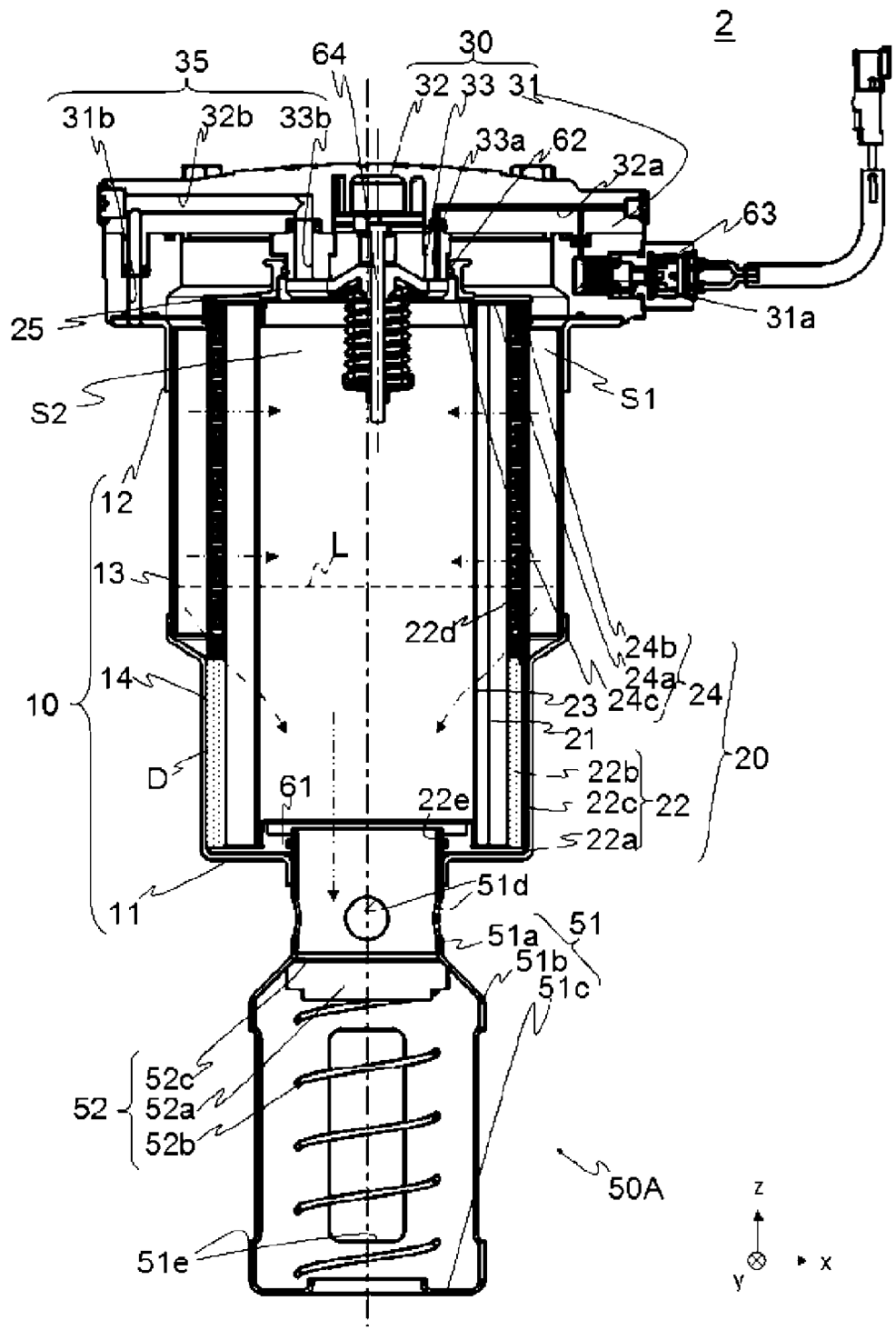
FIG. 6

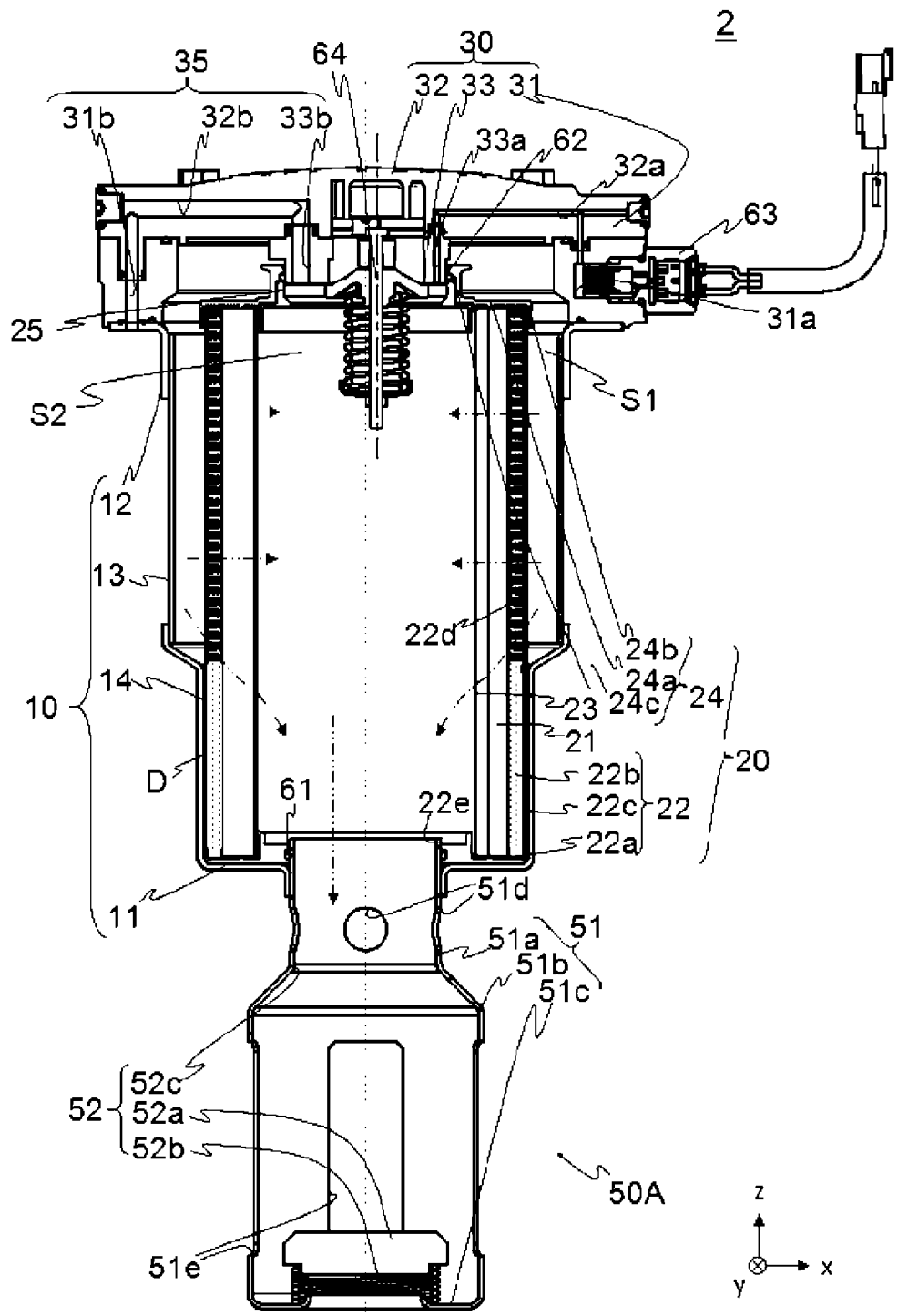
FIG. 7

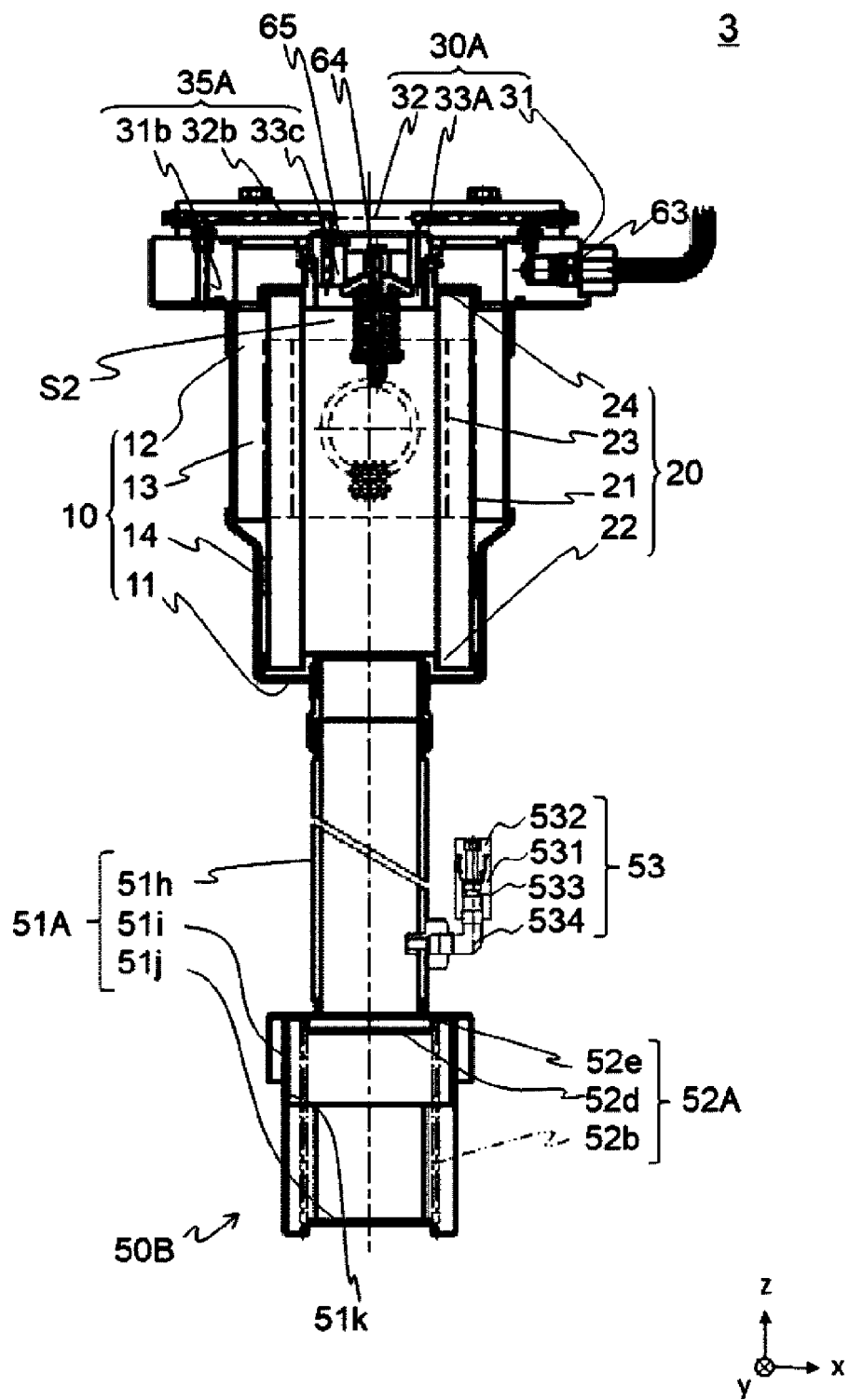
FIG. 8

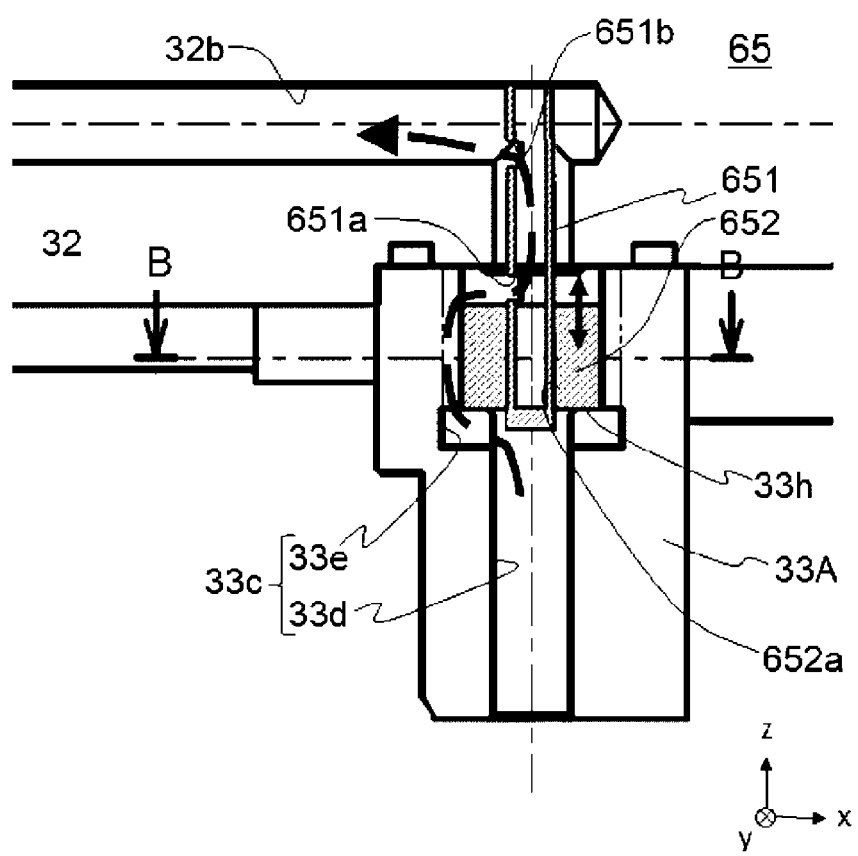
FIG. 9

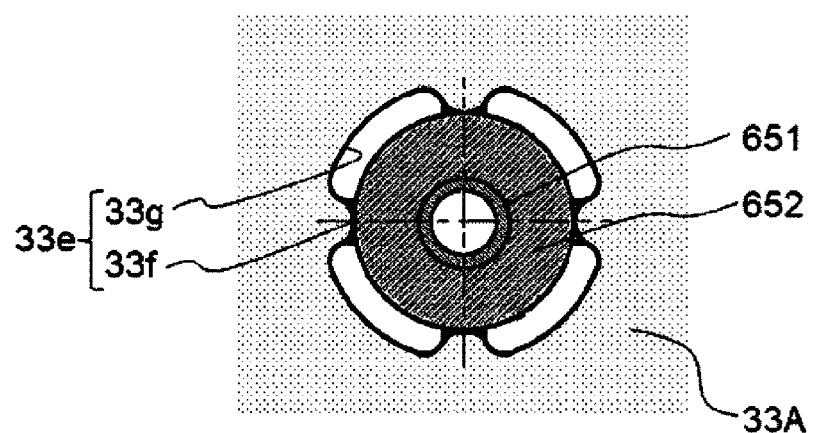
FIG. 10

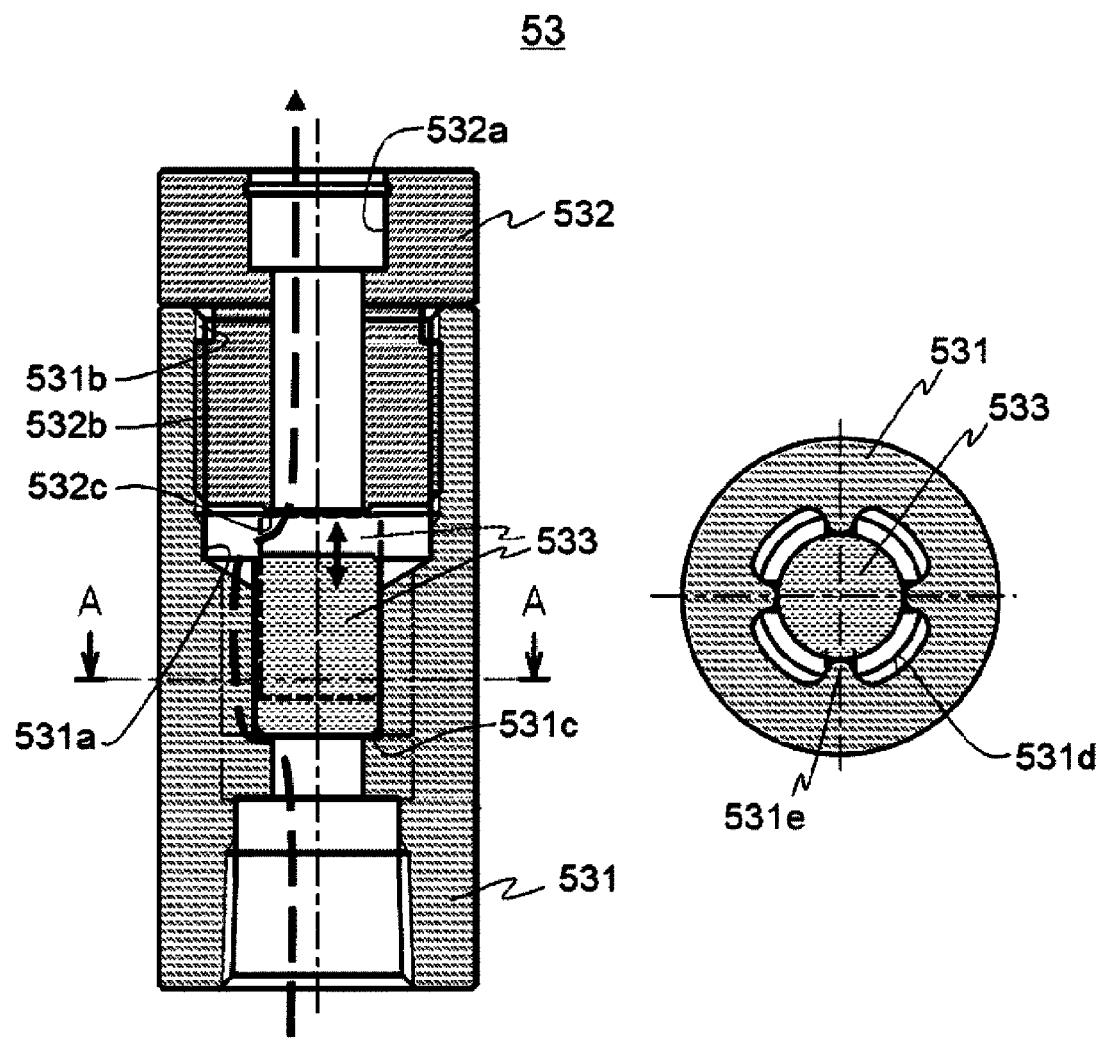
FIG. 11A  FIG. 11B

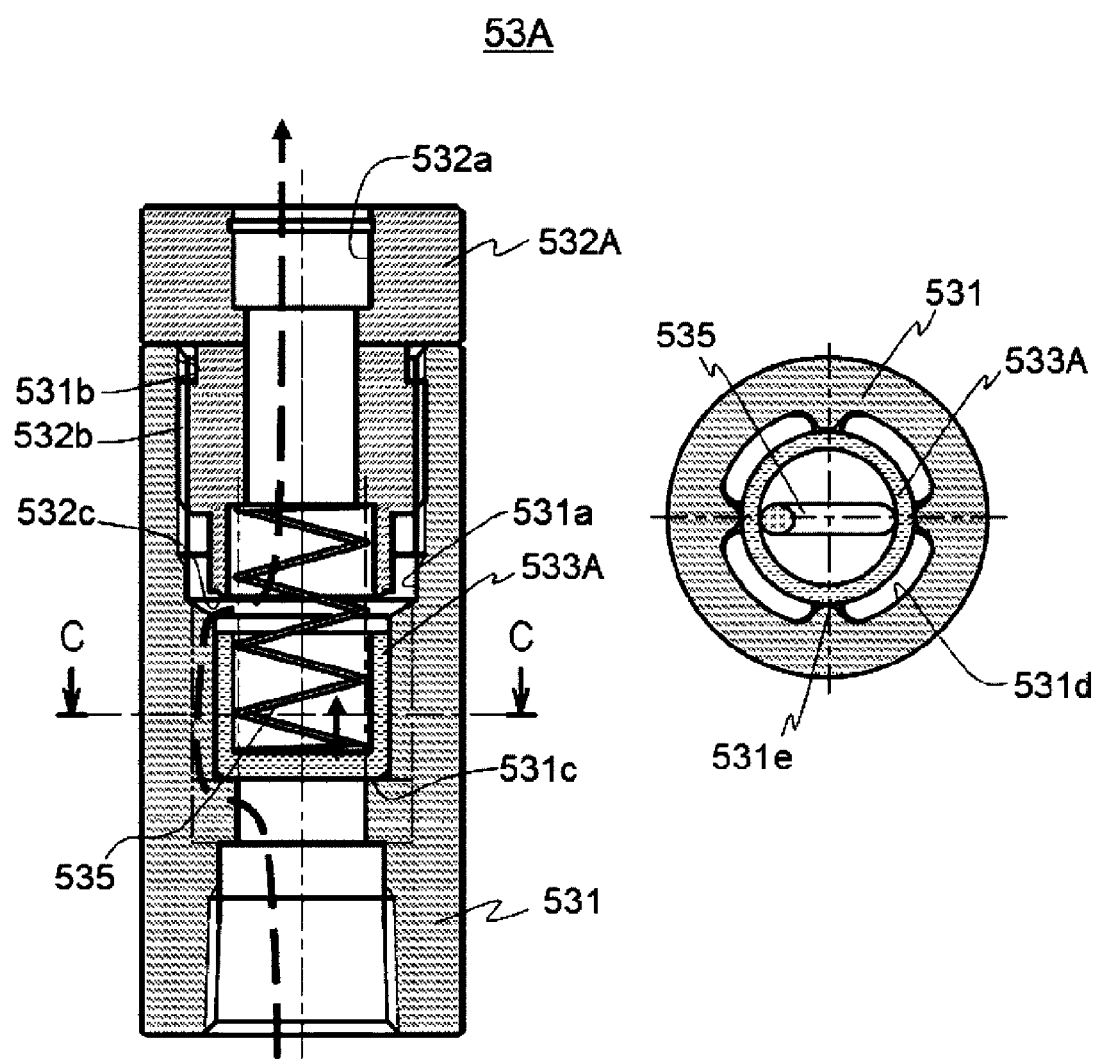
FIG. 12A  FIG. 12B

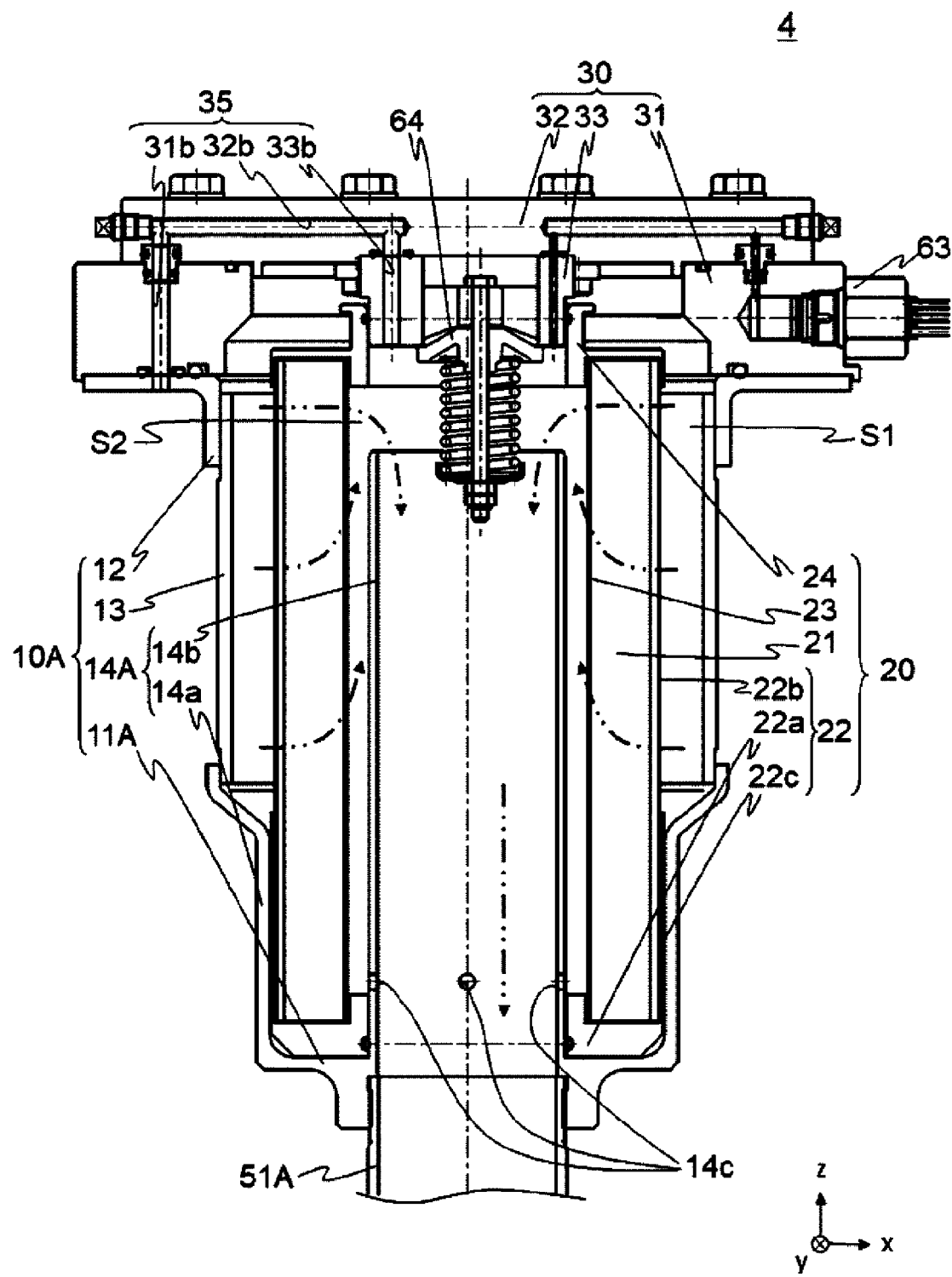
FIG. 13

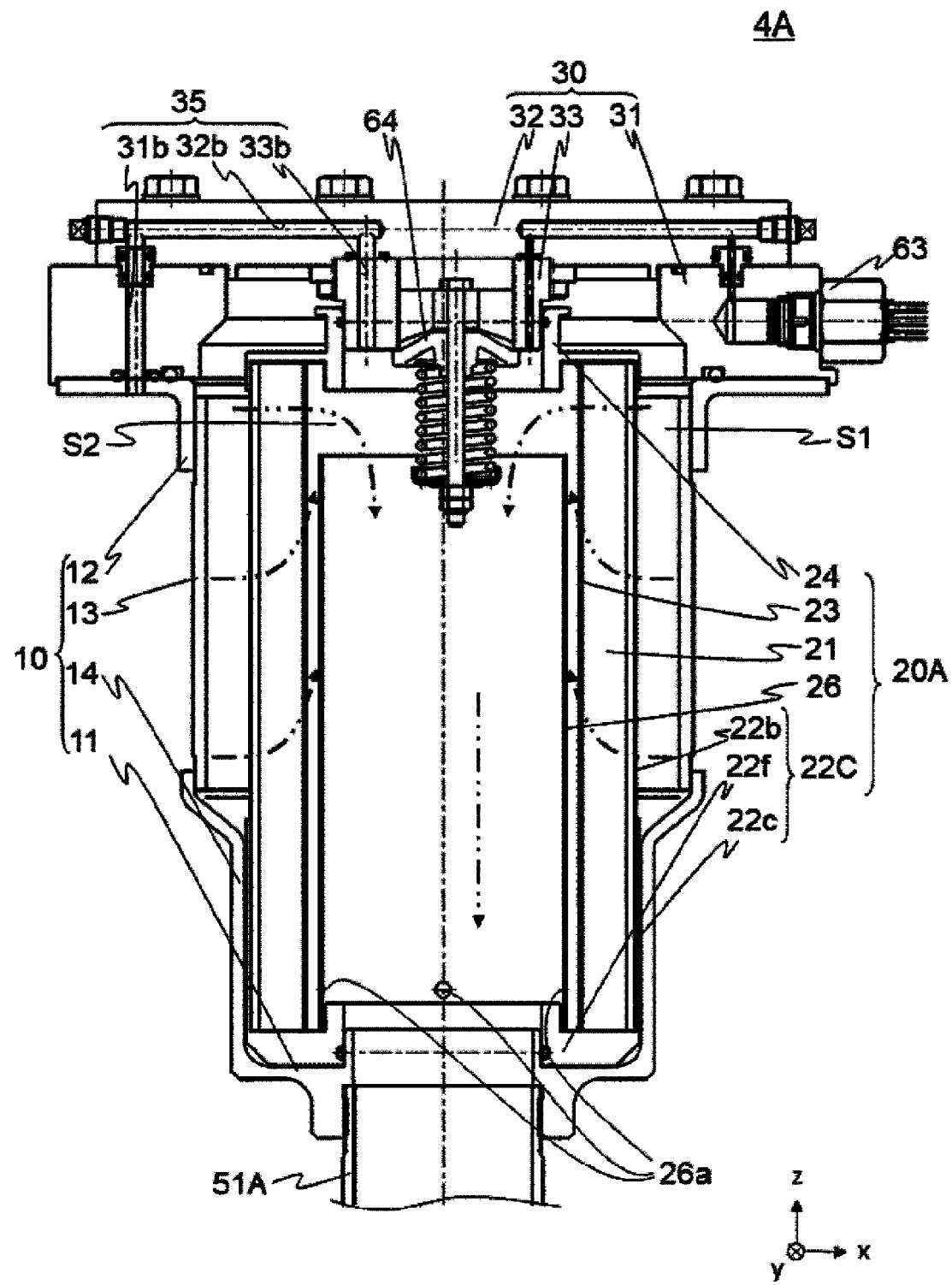
FIG. 14

FILTER DEVICE

CROSS-REFERENCE TO RELATED APPLICATIONS

This application is a continuation application of International Patent Application No. PCT/JP2018/041939 filed on Nov. 13, 2018, which claims priority to Japanese Patent Applications No. 2017-222304 filed on Nov. 17, 2017, No. 2017-223198 filed on Nov. 20, 2017, and No. 2018-152458 filed on Aug. 13, 2018, the entire contents of which are incorporated by reference.

TECHNICAL FIELD

The present invention relates to a filter device.

BACKGROUND ART

Patent Document 1 discloses a liquid filter for an internal combustion engine having a check valve that closes while an internal combustion engine stops and opens while the internal combustion engine operates.

CITATION LIST

Patent Document

Patent Document 1: JP 2009-536088 A

However, in the cited Patent Document 1, opening the check valve discharges air present inside a filter device together with liquid, possibly generating bubbles in the liquid. In a case where the bubbles are mixed in the liquid, for example, a defect that occurs when a pump sucks air or a defect in which a component is damaged when the bubbles burst, for example, in a hydraulic circuit to temporarily increase a temperature and a pressure of hydraulic oil extremely possibly occurs.

SUMMARY OF INVENTION

One or more embodiment of the present invention is to provide a filter device that allows obviating a backflow of liquid inside the filter device during an operation of an internal combustion engine while purging air inside the filter device so as not to generate bubbles in the liquid.

A filter device according to one or more embodiment of the present invention, for example, includes a case, a filter element, a lid body, an inflow portion, and an outflow portion. The case has a substantially bottomed tubular shape with an open upper end. The filter element having a substantially cylindrical shape is provided inside the case. The filter element includes a filter medium having a substantially cylindrical shape, an outer tube portion, and an upper plate. The outer tube portion includes a plate-like portion and a tubular portion. The plate-like portion has a substantially circular plate shape and is provided along a lower end surface of the filter medium. The tubular portion is provided outside the filter medium to be substantially parallel to the filter medium. The upper plate has a part with a substantially circular plate shape and is provided so as to cover upper end surfaces of the filter medium and the outer tube portion. The lid body is provided on the case and the upper plate so as to cover an upper end of the case. The inflow portion communicates between a space inside the case and outside the filter element and a space outside the case. The outflow portion communicates between a space inside the filter element and the space outside the case. The outflow portion is provided so as to penetrate a bottom surface of the case. The lid body has a first hole communicating between a space inside the case and the space outside the case. The outflow portion includes a cylindrical portion having a substantially bottomed cylindrical shape and a back pressure valve provided inside the cylindrical portion. The back pressure valve includes a valve body having a substantially plate shape, a first elastic member, and a first valve seat. The first elastic member is provided between a bottom surface of the cylindrical portion and the valve body. The first valve seat is provided on the cylindrical portion. The cylindrical portion includes a first cylindrical portion and a second cylindrical portion. The first valve seat is provided between the first cylindrical portion and the second cylindrical portion. The second cylindrical portion has a second through-hole on a side surface of the second cylindrical portion. During without abutment of the valve body on the first valve seat, the space inside the filter element communicates with the space outside the case via the second through-hole.

According to one or more embodiment of the filter device according to the present invention, the outflow portion, which includes the cylindrical portion having the substantially bottomed cylindrical shape and the back pressure valve provided inside the cylindrical portion, is provided so as to penetrate the bottom surface of the case. In addition, the lid body, which is provided on the case and the upper plate of the filter element so as to cover the upper end of the case, has the first hole that communicates between the space inside the case and the space outside the case. While the back pressure valve is closed, air inside the case is discharged to the outside of the case through the first hole. This allows the air inside the filter device to be purged so as not to generate bubbles in liquid. Furthermore, when a flow rate of the liquid increases and the back pressure valve opens (the valve body does not abut on the first valve seat), the space inside the filter element communicates with the space outside the case via the second through-hole formed in the side surface of the cylindrical portion. That is, when the flow rate of the liquid is reduced (the internal combustion engine stops), the outflow portion closes. This allows obviating a backflow of the liquid inside the filter device during an operation of the internal combustion engine.

Here, the filter device may be configured as follows. The first hole internally includes a first check valve. The first check valve includes a rod-like (rod-shaped) member and a moving member. The rod-shaped member has a substantially tubular shape and is provided substantially along a vertical direction. The moving member has a tubular hole into which the rod-shaped member is inserted. The moving member moves along the rod-shaped member by sliding of the tubular hole along the rod-shaped member. The rod-shaped member covers both ends. The rod-shaped member has a second hole and a third hole in a side surface of the rod-shaped member. The moving member is movably provided between a first position and a second position. The moving member does not cover the second hole or the third hole at the first position, and the moving member covers the second hole at the second position. The moving member is movable from the second position to the first position by its own weight. As a result, only the air can be discharged via the first hole, and the hydraulic oil is not discharged via the first hole.

Here, the filter device may be configured as follows. The first cylindrical portion has a first through-hole in a side surface of the first cylindrical portion. The first through-hole communicates between the space inside the filter element and the space outside the case. This allows the hydraulic oil after filtration to flow out from the first through-hole when the flow rate of the hydraulic oil is small. Furthermore, while the internal combustion engine stops, air can be flown into the inside of the case through the first hole, thus ensuring gradually lowering an oil surface without removing the lid body from the case.

Here, the filter device may be configured as follows. A second check valve provided on a side surface of the first cylindrical portion is provided. The second check valve includes a valve case, a second valve seat, and a second moving member. A flow path is formed inside the valve case. The second valve seat is provided inside the valve case. The second moving member is movably provided inside the valve case. The flow path communicates with a space inside the first cylindrical portion. A part of the flow path where the second moving member is internally provided has a central axis substantially identical to a vertical direction. A state where the second moving member moves upward in the vertical direction and the second moving member abuts on the second valve seat is a closed state where the second check valve is closed. When the second moving member moves downward in the vertical direction from the closed state by its own weight, the second check valve enters an open state where the second moving member is free from the abutment with the second valve seat. Accordingly, when the flow rate of the hydraulic oil increases, the air inside the case can be avoided to be discharged into the hydraulic oil via the outflow portion. As a result, bubbles are not generated in the hydraulic oil, and, for example, erosion caused by the bubbles can be obviated.

Here, the filter device may be configured as follows. The second check valve includes a second elastic member. The second elastic member biases a force downward in the vertical direction to the second moving member. This facilitates adjustment of the flow rate to open and close the second check valve.

Here, the filter device may be configured as follows. The filter element includes an inner tube provided inside the filter medium. The case or the filter element includes a tubular member provided inside the filter medium. The tubular member has a lower end positioned at substantially a same height as a lower end of the filter medium or a lower side with respect to the lower end of the filter medium. The tubular member has a diameter smaller than a diameter of the inner tube. The tubular member has a height lower than heights of the inner tube and the filter medium. This causes the hydraulic oil to flow upward along the tubular member and is guided to an upper portion of the filter medium. As a result, a filtration area of the filter medium can be effectively used. In addition, since the air easily flows upward along the tubular member, initial air can be effectively removed.

Here, the tubular member may have a drain hole adjacent to the plate-like portion. Accordingly, while a work machine stops, the hydraulic oil present outside the tubular portion can be discharged via the drain hole, and the oil surface in the case can be lowered.

One or more embodiment of the present invention allows obviating the backflow of the liquid inside the filter device during the operation of the internal combustion engine while purging the air inside the filter device so as not to generate bubbles in the liquid.

BRIEF DESCRIPTION OF DRAWINGS

FIG. 1 is a perspective view of a main part illustrating an overview of a tank 100 in which a return filter 1 according to one embodiment of the present invention is provided.

FIG. 2 is a cross-sectional view illustrating an overview of the return filter 1.

FIG. 3 is a cross-sectional view illustrating an overview of a filter element 20.

FIGS. 4A and 4B are perspective views of a main part illustrating an overview of a conventional return filter 110, FIG. 4A illustrates its state during use, and FIG. 4B illustrates a state while a filter element is replaced.

FIGS. 5A and 5B are drawings illustrating modifications of an outer tube portion, FIG. 5A is a partially enlarged view of an outer tube portion 22A according to Modification Example 1, and FIG. 5B is a partially enlarged view of an outer tube portion 22B according to Modification Example 2.

FIG. 6 is a cross-sectional view illustrating an overview of a return filter 2.

FIG. 7 is a cross-sectional view illustrating an overview of the return filter 2.

FIG. 8 is a cross-sectional view illustrating an overview of a return filter 3.

FIG. 9 is a cross-sectional view illustrating an overview of a check valve 65.

FIG. 10 is a cross-sectional view taken along the line B-B in FIG. 9.

FIGS. 11A and 11B are drawings illustrating an overview of a check valve 53, FIG. 11A is its vertical cross-sectional view, and FIG. 11B is a cross-sectional view taken along the line A-A in FIG. 11A.

FIGS. 12A and 12B are drawings illustrating an overview of a check valve 53A, FIG. 12A is its vertical cross-sectional view, and FIG. 12B is a cross-sectional view taken along the line C-C in FIG. 12A.

FIG. 13 is a cross-sectional view illustrating an overview of a return filter 4.

FIG. 14 is a cross-sectional view illustrating an overview of a return filter 4A.

DESCRIPTION OF EMBODIMENTS

Hereinafter, with reference to the drawings, detailed description will be made on embodiments of the present invention. In the present embodiment, while hydraulic oil is described as an example of liquid to be filtered, the liquid to be filtered is not limited to the hydraulic oil. Also, while the following embodiments are described with an example of a return filter, a filter device of the present invention is not limited to the return filter.

First Embodiment

FIG. 1 is a cross-sectional view illustrating an overview of a tank 100 in which a return filter 1 according to one embodiment of the present invention is provided. In FIG. 1, hatching for indicating a cross section is omitted.

The tank 100 is a tank for storing hydraulic oil. The tank 100 is installed in the work machine (not illustrated) (e.g., a hydraulic device), and is provided in a hydraulic circuit of hydraulic oil supplied to the hydraulic device. However, the tank 100 is not limited to one provided in the hydraulic circuit.

The tank 100 is, for example, formed in a box-like shape and hollow inside. The tank 100 mainly has a bottom surface 101, a top surface 102 opposed to the bottom surface 101, and side surfaces 103 substantially orthogonal to the bottom surface 101 and the top surface 102. An opening 102a (see FIG. 2) is formed in the top surface 102.

A mounting plate 104 for mounting the return filter 1 is provided on an upper side (+z-side) of the top surface 102. A through-hole 104a (see FIG. 2) is formed in the mounting plate 104. The return filter 1 is inserted into an inside of the tank 100 from the opening 102a and the through-hole 104a. The opening 102a and the through-hole 104a are covered with a lid body 30 (described in detail later) of the return filter 1.

Note that the mounting plate 104 is not necessarily required. For example, when a thickness of the top surface 102 of the tank 100 is thickened such that the top surface 102 meets the functionality of the mounting plate 104, the mounting plate 104 is unnecessary. In the present invention, the tank 100 includes the mounting plate 104.

An inflow portion 40 (see FIG. 2. FIG. 1 omits the illustration) that causes the hydraulic oil to flow into the inside of the return filter 1 is inserted through the side surface 103. The inflow portion 40 introduces the hydraulic oil from an outside of the tank 100 to the return filter 1. The hydraulic oil introduced into the return filter 1 is filtered by the return filter 1 and stored in the tank 100.

An outflow port (not illustrated) that causes the hydraulic oil in the tank 100 to flow out to, for example, a hydraulic pump (not illustrated) is formed in the vicinity of the bottom surface 101. A suction strainer 9 is provided inside the tank 100. The hydraulic oil that has passed through the suction strainer 9 flows out from the outflow port to the outside of the tank 100.

A partition plate 105 is provided inside the tank 100 such that the hydraulic oil that has flown out from the return filter 1 does not directly contact the suction strainer 9. Note that the partition plate 105 is not necessarily required.

Next, the return filter 1 will be described. FIG. 2 is a cross-sectional view illustrating an overview of the return filter 1. In FIG. 2, hatching for indicating a cross section is omitted.

The return filter 1 mainly includes a case 10, a filter element 20, the lid body 30, the inflow portion 40, and an outflow portion 50.

The case 10 is formed of a material having high corrosion resistance (e.g., metal such as stainless steel). The case 10 is provided inside the tank 100 so as to protrude from the top surface 102 of the tank 100 to a lower side (−z-side) (see FIG. 1).

The case 10 has a bottomed substantially tubular shape and has an open upper end surface. The case 10 is hollow inside and internally includes, for example, the filter element 20.

The case 10 has a bottom surface 11. The outflow portion 50 is provided so as to penetrate the bottom surface 11. The outflow portion 50 communicates between a space inside the filter element 20 and a space outside the case 10.

A mounting member 12 is provided in the vicinity of an upper end of the case 10. The case 10 is provided in the tank 100 (here, to the mounting plate 104) via the mounting member 12. Furthermore, the mounting member 12 integrates the case 10 and a flange portion 31 (described in detail later).

The case 10 has two tubular portions 13 and 14 with different diameters. The tubular portion 14 has the diameter smaller than the diameter of the tubular portion 13. The tubular portion 14 is provided on a lower side of the tubular portion 13.

The inflow portion 40 is provided for the tubular portion 13. The inflow portion 40 communicates between a space inside the case 10 and outside the filter element 20 (space S1) and a space outside the case 10 and inside the tank 100 (space S3, see FIG. 1). An inflow of the hydraulic oil from the inflow portion 40 stores the hydraulic oil in the case 10.

The filter element 20 is a member having a bottomed substantially tubular shape and provided inside the case 10. The filter element 20 mainly includes a filter medium 21, an outer tube portion 22, an inner tube 23, a plate 24, and a plate 25. The outer tube portion 22, the inner tube 23, and the plate 24 are integrated with the filter medium 21.

FIG. 3 is a cross-sectional view illustrating an overview of the filter element 20. In FIG. 3, hatching for indicating a cross section is omitted. The filter medium 21 is a member having a substantially cylindrical shape and having openings at both ends. The filter medium 21 is formed by pleating a filter paper using, for example, synthetic resin or a paper, and connecting both ends of the pleated filter paper to form a cylindrical shape. The inner tube 23 where holes through which the hydraulic oil passes are formed in a substantially entire area is provided inside the filter medium 21.

The outer tube portion 22 is provided on an end on a lower side of the filter medium 21 and outside the filter medium 21. The outer tube portion 22 mainly includes a plate-like portion 22a having a substantially circular plate shape provided along a lower end surface of the filter medium 21, and tubular portions 22b and 22c outside the filter medium 21 provided substantially parallel to the filter medium 21.

The plate-like portion 22a is a substantially circular plate-shaped member having the central portion thicker than its peripheral edge portion, and has a hole 22e having a substantially columnar shape in the center. The outflow portion 50 is inserted into the hole 22e. The hole 22e and the outflow portion 50 are sealed by a sealing member (for example, an O-ring) 61.

The tubular portion 22b has a height substantially the same as a height of the filter medium 21. The tubular portion 22c has a height lower than that of the filter medium 21 and abuts on an outer circumferential surface of the tubular portion 22b. The tubular portion 22b and the tubular portion 22c are integrated. A clearance is provided between the tubular portion 22b and the filter medium 21. This clearance serves as a dust pocket D (described in detail later). Note that although it is only necessary that the tubular portion 22b does not abut on the filter medium 21, as illustrated, the clearance of approximately half the thickness of the filter medium 21 is desirably present between the tubular portion 22b and the filter medium 21.

As illustrated in FIG. 2, in a state where the filter element 20 is provided inside the case 10, the plate-like portion 22a abuts on the bottom surface 11, and the tubular portion 22c abuts on the tubular portion 14. As a result, the hydraulic oil does not flow into between the filter element 20 (tubular portion 22c) and the tubular portion 14.

Note that "the tubular portion 22c abuts on the tubular portion 14" described here includes a case where a fine clearance is formed between the tubular portion 22c and the tubular portion 14 so that the filter element 20 (tubular portion 22c) can move relative to the tubular portion 14. In other words, the state where the hydraulic oil does not enter between the tubular portion 22c and the tubular portion 14 is referred to as a state where "the tubular portion 22c abuts on the tubular portion 14." For example, a case where about 0.5 mm clearance is provided between the tubular portion 22c and the tubular portion 14 is also included in the case where "the tubular portion 22c abuts on the tubular portion 14."

Holes 22d through which the hydraulic oil passes are formed in a substantially entire area of a part of the tubular portion 22b on which the tubular portion 22c does not abut.

Meanwhile, the hole 22d is not formed in a part on which the tubular portion 22c abuts. Moreover, the hole 22d is not formed in the tubular portion 22c. In other words, the holes 22d are formed in the substantially entire area of the part not abutting on the tubular portion 14 of the tubular portions 22b and 22c, and the hole 22d is not formed in the part abutting on the tubular portion 14 of the tubular portions 22b and 22c.

Note that in the present embodiment, while the hole 22d is not formed in the part abutting on the tubular portion 14 of the tubular portion 22b, the hole 22d may be formed in the substantially entire area of the tubular portion 22b. The tubular portion 22c covers an outside of the tubular portion 22b, and therefore even when the holes 22d are formed in the substantially entire area of the tubular portion 22b, it can be said that the holes 22d are not formed in the part abutting on the tubular portion 14 of the tubular portions 22b and 22c.

The description will now return to FIG. 3. The plate 24 is provided on an end on the upper side of the filter medium 21. The plate 24 covers upper end surfaces of the filter medium 21, the outer tube portion 22, and the inner tube 23.

The plate 24 mainly includes a plate-like portion 24a having a substantially circular plate shape provided along an upper end surface of the filter medium 21, a tubular portion 24b outside the tubular portion 22b provided substantially parallel to the tubular portion 22b, and a tubular portion 24c provided on an inner peripheral edge of the plate-like portion 24a. The tubular portion 24b protrudes downward (in the −z direction) from the plate-like portion 24a and abuts on the tubular portion 22b. The tubular portion 24c protrudes upward (in the +z direction) from the plate-like portion 24a. The plate 25 is provided on a lower side of the tubular portion 24c. Note that the plate 25 may be part of the plate 24.

The description will now return to FIG. 2. The lid body 30 is provided outside the tank 100 (in the present embodiment, an upper side of the mounting plate 104 provided outside the tank 100). The lid body 30 is provided on the case 10 (here, the mounting member 12) and the plate 24 (here, the tubular portion 24c) so as to cover the opening of the upper end surface of the case 10.

The lid body 30 mainly includes the flange portion 31, a cover 32, and a mounting portion 33. The flange portion 31 has a substantially cylindrical shape and is fixed to the case 10 (here, the mounting member 12). The cover 32 is a substantially plate-shaped member and provided on the upper side (+z-side) of the flange portion 31 so as to cover a hollow portion of the flange portion 31. The cover 32 is detachably provided to the flange portion 31.

A hole 31a is formed in the flange portion 31, and an indicator 63 is attached to the hole 31a. The indicator 63 detects a difference between a pressure inside the case 10 and a pressure outside the case. By providing the indicator 63 on the flange portion 31, the indicator 63 remains attached to the case 10 side when the filter element 20 is replaced, and therefore maintenance is easy.

The mounting portion 33 is provided on the cover 32. The mounting portion 33 is a substantially tubular member, and protrudes to the lower side (−z-side) of the cover 32. A valve 64 is provided on a lower side of the mounting portion 33. In other words, the valve 64 is provided on the cover 32 via the mounting portion 33.

As illustrated in FIG. 2, the valve 64 is usually closed. When the filter medium 21 becomes clogged and the pressure inside the case 10 increases, the valve 64 opens to flow the hydraulic oil from the space (space S1) inside the case 10 and outside the filter element 20 to the space inside the filter element 20 and to obviate damage to the return filter 1. The valve 64 is already well known, and thus, the description is omitted.

The mounting portion 33 is inserted into the tubular portion 24c, and the valve 64 is inserted into a hollow portion (space S2) of the filter element 20. The mounting portion 33 and the tubular portion 24c are sealed by a sealing member (for example, an O-ring) 62. Holes 33a and 33b that penetrate in a thickness direction (z direction) are formed in the mounting portion 33.

The hole 33a and a hole 32a formed in the cover 32 communicate between the internal space of the filter element 20 and the hole 31a. This allows the indicator 63 to measure the pressure in the internal space of the filter element 20.

The hole 33b, a hole 32b formed in the cover 32, a hole 31b formed in the flange portion 31, a hole 104b formed in the mounting plate 104, and a hole 102b formed in the top surface 102 are connected to constitute a flow path 35 for air and hydraulic oil. The flow path 35 has a substantially U shape as a whole and has both ends opening to a surface on a lower side of the lid body 30. The flow path 35 communicates between the space S2 and the space S3.

Next, the functionality of the return filter 1 thus configured will be described. The dash-dotted line arrows in FIG. 2 indicate a flow of the hydraulic oil.

For example, when the work machine starts driving, the hydraulic oil starts flowing the inside of the hydraulic circuit. In association with this, the hydraulic oil flows into the space S1 and the inside of the case 10 is filled with the hydraulic oil. Because the inside of the case 10 (spaces S1 and S2) is filled with initial air, as a position of an oil surface in the case 10 rises (moves in the +z direction), the initial air passes through the flow path 35 and is discharged to the space S3.

The hydraulic oil flowing into the space S1 flows from the outside to the inside of the filter medium 21, and the filter medium 21 removes, for example, dust in the hydraulic oil. The hydraulic oil after filtration flows out to the space S2. After that, the hydraulic oil after filtration flows out from the outflow portion 50 to the space S3. Furthermore, the hydraulic oil after filtration that has not flown out from the outflow portion 50 flows out to the space S3 via the flow path 35.

Since the repeated filtration clogs the filter medium 21, the filter element 20 is replaced. To replace the filter element 20, the work machine is stopped first. As the work machine stops, the hydraulic oil ceases to flow into the space S1, and thus the oil surface in the case 10 lowers. In the process, the dust captured by the filter medium 21 falls in the −z direction and remains in the dust pocket D between the filter medium 21 and the tubular portion 22c.

Here, the flow path is formed in the lid body 30. Therefore, the air passes through the flow path 35 and flows from the space S3 into the spaces S1 and S2, thus gradually lowering the oil surface even without removing the cover 32 from the flange portion 31 (synonymous with the case 10). Accordingly, when a certain amount of period (for example, approximately five minutes) has passed after the work machine stops, the air passes through the flow path 35 and flows into the inside of the case 10, and thus the oil surface lowers with respect to the bottom surface 11 without removing the cover 32 from the flange portion 31 (case 10).

In this way, the hydraulic oil stored in the case 10 is all discharged to the tank 100. Because the dust does not pass through the filter medium 21, the dust remains in the dust pocket D and the hydraulic oil after filtration passes through the filter medium 21. In addition, because the tubular portion 22c abuts on the tubular portion 14, the hydraulic oil prior to filtration does not remain between the tubular portion 22c and the tubular portion 14.

When the cover 32 of the lid body 30 is removed from the flange portion 31, the filter element 20 can be extracted from the open end on the upper portion of the case 10. The hole 22d is not formed in the tubular portion 22c, so the dust removed by the filter medium 21 remains in the dust pocket D. Thus, when the used filter element 20 is extracted, the dust removed by the filter medium 21 does not escape to the outside of the filter element 20.

Furthermore, after a certain amount of period has passed after the work machine stops, the hydraulic oil is all discharged from the case 10, and the oil surface is lower than the bottom surface (here, the plate-like portion 22a) of the filter element 20. Therefore, the filter element 20 is not immersed in the hydraulic oil, and the used filter element 20 from which the oil is drained is extracted. As a result, a drip of the hydraulic oil to the outside of the return filter 1 can be avoided.

According to the present embodiment, the tubular portion 22c abuts on the tubular portion 14, this allows avoiding the dust contained in the liquid before filtration to flow out to the outside while the filter element is replaced. In addition, the formation of the flow path 35 in the cover 32 allows draining off the oil of the filter element 20 before removing the cover 32. Thus, the drip of the hydraulic oil to the outside of the return filter 1 (causing an oil drip) during the replacement can be obviated.

A known return filter is now described for comparison with the present invention. FIGS. 4A and 4B are perspective views of a main part illustrating an overview of a conventional return filter 110, FIG. 4A illustrates its state during use, and FIG. 4B illustrates a state while a filter element is replaced. The return filter 110 is provided inside a tank that stores hydraulic oil. In FIGS. 4A and 4B, a range in which the hydraulic oil is present is indicated by shading.

As illustrated in FIG. 4A, the hydraulic oil is fully contained in a case 111 during use. However, because the flow path 35 is not formed in the return filter 110, the oil does not flow out from the case 111 even when a work machine stops operating. As illustrated in FIG. 4B, although an oil surface lowers for the first time when a lid 112 is removed in a replacement work, the oil surface cannot be lowered with respect to a bottom surface of the case 111. Furthermore, even in the state where the oil surface lowers, a lower portion of the filter element 20 is immersed in the hydraulic oil prior to filtration. Thus, when a filter element 113 is pulled up, the hydraulic oil before filtration is mixed in an inside of the tank.

In contrast, in the present embodiment, the hydraulic oil can be discharged from the case 10 prior to the replacement work, so the oil of the filter element 20 can be drained off prior to the replacement work, and therefore the oil drip can be obviated.

Note that in the present embodiment, while the outside of the tubular portion 22b is covered with the tubular portion 22c to provide the dust pocket D in the filter element 20, the configuration of the tubular portions 22b and 22c is not limited to this configuration. FIGS. 5A and 5B are drawings illustrating modifications of an outer tube portion, FIG. 5A is a partially enlarged view of an outer tube portion 22A according to Modification Example 1, and FIG. 5B is a partially enlarged view of an outer tube portion 22B according to Modification Example 2.

As in the outer tube portion 22A illustrated in FIG. 5A, a tubular portion 22b-1 may be integrated with an upper side of the tubular portion 22c by, for example, welding and may configure a diameter of the tubular portion 22c and a diameter of the tubular portion 22b to be substantially the same. In addition, as in the outer tube portion 22B illustrated in FIG. 5B, a projection may be provided in a tubular portion 22c-1, and a claw at a distal end of a tubular portion 22b-2 may be fitted to the projection of the tubular portion 22c-1 to integrate the tubular portion 22c-1 with the tubular portion 22b-1. In the case of the outer tube portions 22A and 22B according to the modifications as well, the tubular portions 22c and 22c-1 abut on the tubular portion 14.

Note that while in the present embodiment, the flow path 35 communicates between the space S2 and the space S3, the flow path 35 only needs to communicate between the internal space of the case 10 and the external space of the case 10. For Example, a flow path that communicates between the space S2 and the external space of the tank 100 may be provided in the lid body 30. In this case as well, the air can pass through the flow path and be flown into the inside of the case 10 while the work machine stops. However, when the flow path communicates between the space S2 and the external space of the tank 100, for example, a valve is desirably provided in the flow path so that the hydraulic oil inside the case 10 does not flow out to the outside of the tank 100.

While in the present embodiment, the flange portion 31 is provided with the indicator 63, various sensors other than the indicator 63 can be attached to the flange portion 31. For example, providing a temperature sensor in the flange portion 31 allows measuring a temperature inside the space S2.

Second Embodiment

The second embodiment of the present invention has a configuration in which an outflow portion includes a back pressure valve. Below, description is given of a return filter 2 according to the second embodiment. Note that the same components as those in the first embodiment are denoted by the same reference numerals, and descriptions thereof will be omitted.

FIG. 6 and FIG. 7 are cross-sectional views illustrating an overview of the return filter 2. In FIG. 6 and FIG. 7, hatching for indicating a cross section is omitted. The return filter 2 mainly includes the case 10, the filter element 20, the lid body 30, the inflow portion 40 (illustration is omitted), and an outflow portion 50A.

The outflow portion 50A mainly includes a cylindrical portion 51 having a substantially bottomed cylindrical shape and a back pressure valve 52.

The cylindrical portion 51 has the substantially bottomed cylindrical shape as a whole, and includes a first cylindrical portion 51a, a second cylindrical portion 51b, and a bottom surface 51c. The second cylindrical portion 51b is provided on a lower side of the first cylindrical portion 51a. An outflow hole 51d is formed in the first cylindrical portion 51a, and an outflow hole 51e is formed in the second cylindrical portion 51b. The outflow holes 51d and 51e are formed on side surfaces of the first cylindrical portion 51a and the second cylindrical portion 51b so as to penetrate the first cylindrical portion 51a and the second cylindrical portion 51b, respectively.

The back pressure valve 52 is provided inside the cylindrical portion 51. The back pressure valve 52 mainly includes a substantially plate-shaped valve body 52a, an elastic member 52b provided between the bottom surface 51c of the cylindrical portion 51 and the valve body 52a, and a valve seat 52c provided on the cylindrical portion 51. The valve seat 52c is provided between the first cylindrical portion 51a and the second cylindrical portion 51b.

Next, the functionality of the return filter 2 thus configured will be described. FIG. 6 illustrates a closed state of the back pressure valve 52 in which the valve body 52a abuts on the valve seat 52c. FIG. 7 illustrates an open state of the back pressure valve 52 in which the valve body 52a does not abut on the valve seat 52c. As the pressure inside the case 10 rises, the valve body 52a moves against a biasing force from the elastic member 52b, from the closed state to the open state.

When the operation of the internal combustion engine (engine) of the work machine stops, the hydraulic oil is not contained in the case 10. Thus, as illustrated in FIG. 6, the back pressure valve 52 is in the closed state. In the closed state, while the space S2 communicates with the space S3 via the outflow hole 51d, the space S2 does not communicate with the space S3 via the outflow hole 51e.

While the engine is idling, a flow rate of the hydraulic of is small, substantially 40 L (liters)/minute. In this case, the hydraulic oil flows into the inside of the case 10 from the inflow portion, the oil surface rises up to a position of an oil surface L indicated by the long-dotted line, the hydraulic oil is filtered by the filter medium 21, and the hydraulic oil after filtration flows out from the outflow hole 51d. However, because the flow rate of the hydraulic oil is small and the pressure inside the case 10 is not sufficiently high, the back pressure valve 52 is in the closed state as illustrated in FIG. 6.

In contrast, while the engine of the work machine is operating, the flow rate of the hydraulic oil is large, and the flow rate increases up to substantially 1000 L (liters)/minute. In this case, the inside of the case 10 is filled with the hydraulic oil, and the pressure inside the case 10 becomes sufficiently high. Thus, as illustrated in FIG. 7, the hydraulic oil pushes down the valve body 52a against the biasing force from the elastic member 52b, and the space S2 communicates with the space S3 via the outflow hole 51e. Similar to the closed state, the space S2 communicates with the space S3 via the outflow hole 51d in the open state as well. As a result, the hydraulic oil after filtration flows out from the outflow hole 51d and flows out from the outflow hole 51e.

After that, when the engine of the work machine stops, the flow rate of the hydraulic oil decreases and the back pressure valve 52 closes. Furthermore, the hydraulic oil in the case 10 flows out from the outflow hole 51d, and the oil surface in the case 10 lowers. Thus, when a certain amount of period has passed after the work machine stops, the air flows into the inside of the case 10 through the flow path 35, thereby lowering the oil surface with respect to the bottom surface 11 without removing the cover 32 from the flange portion 31 (case 10). Thus, extracting the used filter element 20 in the oil drained state allows obviating the oil drip.

According to this embodiment, while the engine is idling, the flow rate of the hydraulic oil is small, the back pressure valve 52 is closed, and the air inside the case 10 is discharged to the outside of the case 10 through the flow path 35. Accordingly, the air inside the return filter 2 can be purged so that no bubbles are generated in the hydraulic oil. In addition, by providing the back pressure valve 52, when the flow rate of the hydraulic oil is small, the air does not flow from the flow path 35 into the inside of the case 10, thus ensuring stable driving.

Third Embodiment

The third embodiment of the present invention is a configuration in which an outflow portion and a flow path include check valves. A return filter 3 according to the third embodiment will be described below. Note that the same components as those in the first embodiment and the second embodiment are denoted by the same reference numerals, and descriptions thereof will be omitted.

FIG. 8 is a cross-sectional view illustrating an overview of the return filter 3. In FIG. 8, hatching for indicating a cross section is omitted. The return filter 3 mainly includes the case 10, the filter element 20, a lid body 30A, the inflow portion 40 (illustration is omitted), and an outflow portion 50B.

The lid body 30A mainly includes the flange portion 31, the cover 32, and a mounting portion 33A. The mounting portion 33A is a substantially tubular-shaped member, and protrudes to the lower side (−z-side) of the cover 32. The valve 64 is provided on a lower side of the mounting portion 33A. Furthermore, a hole 33c is formed in the mounting portion 33A.

The hole 33c, the hole 32b, the hole 31b, the hole 104b (FIG. 8 omits the illustration), and the hole 102b (FIG. 8 omits the illustration) constitute a flow path 35A for air and hydraulic oil. A check valve 65 is provided inside the flow path 35A.

FIG. 9 is a cross-sectional view illustrating an overview of the check valve 65. In FIG. 9, hatching for indicating a cross section is partly omitted. The check valve 65 mainly includes a rod-like member 651 and a moving member 652.

The rod-like member 651 has a substantially tubular shape and covers both ends. The rod-like member 651 is provided substantially along the flow path 35A (here, the hole 33c). The rod-like member 651 has two holes 651a and 651b on its side surface.

The moving member 652 is a member having a substantially cylindrical shape, and has a tubular hole 652a into which the rod-like member 651 is inserted. By sliding the tubular hole 652a along the rod-like member 651, the moving member 652 moves along the rod-like member 651.

The hole 33c has a hole 33d having a substantially cylindrical shape and a hole 33e having an inner diameter larger than that of the hole 33d. The moving member 652 is provided inside the hole 33e. FIG. 10 is a cross-sectional view taken along the line B-B in FIG. 9. The hole 33e has four projections 33f that regulate the movement of the moving member 652. Distal ends of the projections 33f abut on an outer circumferential surface of the moving member 652. The hole 33e has four recessed portions 33g serving as flow paths.

The description will now return to FIG. 9. In a usual time during which the moving member 652 is not pushed up by the hydraulic oil (the state illustrated in FIG. 9), the moving member 652 abuts on a positioning portion 33h formed in the hole 33c and does not cover the hole 651a or the hole 651b. Thus, as illustrated by the dashed line in FIG. 9, the air flows from the hole 33d to the hole 32b via the internal space of the rod-like member 651.

When the moving member 652 is pushed up by the hydraulic oil, the moving member 652 moves in the +z direction and rises until it abuts on the cover 32. At this time, the moving member 652 covers the hole 651a (does not cover the hole 651b) and the hydraulic oil does not flow into the internal space of the rod-like member 651, namely, the flow path 35A. By providing the check valve 65 inside the flow path 35A in this manner, only the air can be discharged via the flow path 35A and the hydraulic oil is not discharged via the flow path 35A.

The description will now return to FIG. 8. The outflow portion 50B mainly includes a cylindrical portion 51A having a substantially bottomed cylindrical shape, a back pressure valve 52A, and the check valve 53.

The cylindrical portion 51A has a substantially bottomed cylindrical shape as a whole, and includes a first cylindrical portion 51h having a substantially cylindrical shape, a second cylindrical portion 51i having a substantially cylindrical shape, and a bottom surface 51j. The second cylindrical portion 51i is provided on a lower side of the first cylindrical portion 51h. The bottom surface 51j obstructs a bottom surface of the second cylindrical portion 51i. An outflow hole 51k is formed in the second cylindrical portion 51i. The outflow hole 51k is formed in a side surface of the second cylindrical portion 51i so as to penetrate the second cylindrical portion 51i.

The back pressure valve 52A is provided inside the second cylindrical portion 51i. The back pressure valve 52A mainly includes a substantially plate-shaped valve body 52d, the elastic member 52b provided between the bottom surface 51j of the cylindrical portion 51A and the valve body 52d, and a valve seat 52e provided on the cylindrical portion 51A. The valve seat 52e is provided between the first cylindrical portion 51h and the second cylindrical portion 51i.

As the pressure inside the case 10 rises, the valve body 52d moves against a biasing force from the elastic member 52b, from the closed state in which the valve body 52d abuts on the valve seat 52e (the state illustrated in FIG. 8) to the open state in which the valve body 52d does not abut on the valve seat 52e.

When the operation of the engine of the work machine stops, the hydraulic oil is not contained in the case 10. Thus, the back pressure valve 52A is in the closed state and the space S2 does not communicate with the space S3 (see FIG. 1).

When the engine of the work machine operates and the flow rate of the hydraulic oil increases, the inside of the case 10 is filled with the hydraulic oil, and the pressure inside the case 10 becomes sufficiently high. Thus, the hydraulic oil pushes down the valve body 52d against the biasing force from the elastic member 52b, and the back pressure valve 52A enters the open state. As a result, the space S2 communicates with the space S3 via the outflow hole 51k, and the hydraulic oil after filtration flows out from the outflow hole 51k.

While the back pressure valve 52A enters the open state from the closed state, the hydraulic oil gradually flows into the inside of the case 10, and therefore, the air that has filled the inside of the case 10 is pushed out of the case 10. While the air is primarily discharged from the flow path 35A, a part of the air is discharged from the check valve 53.

The check valve 53 mainly includes a tubular case 531, an upper end member 532, a moving member 533, and a tube-shaped portion 534. The tube-shaped portion 534 is a tube that connects the cylindrical portion 51A and the tubular case 531, and has one end provided on the first cylindrical portion 51h and the other end provided on the tubular case 531. The tubular case 531, the upper end member 532, and the tube-shaped portion 534 constitute a valve case. The moving member 533 is provided inside the valve case.

FIGS. 11A and 11B are drawings illustrating an overview of the check valve 53, FIG. 11A is its vertical cross-sectional view, and FIG. 11B is a cross-sectional view taken along the line A-A in FIG. 11A. In FIGS. 11A and 11B, hatching for indicating a cross section is partly omitted. The tubular case 531 is a member having a substantially cylindrical shape, and internally has a hole 531a serving as a flow path. The tube-shaped portion 534 communicates between the hole 531a and a space inside the first cylindrical portion 51h. The central axis of the hole 531a is substantially identical to the vertical direction.

The upper end member 532 is a member attached to an upper end of the tubular case 531. A hole 532a serving as a flow path is formed inside the upper end member 532. A female screw portion 531b is formed in the vicinity of an upper end of the hole 531a, and a male screw portion 532b of the upper end member 532 is screwed into the female screw portion 531b. When the upper end member 532 is screwed onto the tubular case 531, the hole 531a communicates with the hole 532a.

The upper end member 532 has a lower end surface as a valve seat 532c. The valve seat 532c is provided on an upper end side of the valve case.

The moving member 533 is a member having a substantially cylindrical shape and provided inside the hole 531a. As illustrated in FIG. 11B, the hole 531a has four projections 531e that regulate the movement of the moving member 533. Distal ends of the projections 531e abut on an outer circumferential surface of the moving member 533. The hole 531a has four recessed portions 531d serving as flow paths. Thus, the moving member 533 is movable inside the hole 531a in the z direction.

As illustrated in FIG. 11A, while the moving member 533 is not pushed up by the hydraulic oil, the moving member 533 abuts on a positioning portion 531c formed in the hole 531a. The positioning portion 531c is provided on a lower end side of the valve case.

While the moving member 533 abuts on the positioning portion 531c, the check valve 53 is in the open state, and the air in the case 10 is discharged to the space S3 through the check valve 53 (see the dashed line in FIG. 11A). When the moving member 533 is pushed up and moves upward in the vertical direction, the moving member 533 abuts on the valve seat 532c (see the dotted line in FIG. 11A).

Next, the functionality of the return filter 3 thus configured will be described. When the operation of the internal combustion engine (engine) of the work machine stops, the hydraulic oil is not contained in the case 10 and the back pressure valve 52A is in the closed state. In addition, the check valve 53 and the check valve 65 are in the open state.

When the engine of the work machine starts operating, since the flow rate of the hydraulic oil, that is, the hydraulic oil flowing the inside of the cylindrical portion 51A, is small, the hydraulic oil cannot push up the moving member 533. Thus, the check valve 53 is in the open state, and the air or the hydraulic oil flows to the space S3 via the check valve 53.

In contrast, an increase in the flow rate of the hydraulic oil rises the pressure inside the case 10 and increases the hydraulic oil flowing the inside of the cylindrical portion 51A, and thus the hydraulic oil flows into the hole 531a via the tube-shaped portion 534. As a result, the hydraulic oil pushes up the moving member 533, and the check valve 53 is in the closed state. This obviates gushing of the oil from the check valve 53 when the engine is operated and causing generation of bubbles. Further, at substantially the same time when the check valve 53 enters the closed state, the hydraulic oil pushes up the moving member 652, and the check valve 65 enters the closed state. This allows avoiding the hydraulic oil in the case 10 to be discharged via the flow path 35A.

Note that, during idling (low flow rate), the initial air in the case 10 is discharged to the space S3 through the flow path 35A, and therefore, the initial air is not discharged from the case 10 after the flow rate of the hydraulic oil increases.

Also, as the flow rate of the hydraulic oil increases, the back pressure valve 52A opens. As a result, the hydraulic oil after filtration flows out from the outflow hole 51k.

After that, when the engine of the work machine stops, the flow rate of the hydraulic oil decreases and the back pressure valve 52A closes. When the engine of the work machine stops, the moving member 533 moves in the −z direction by its own weight, and the check valve 53 enters the open state. As a result, the hydraulic oil in the case 10 is discharged via the check valve 53. In addition, when the engine of the work machine stops, the moving member 652 moves in the −z direction by its own weight, and the check valve 65 enters the open state. As a result, the air flows into the inside of the case 10 through the flow path 35A. In this way, the oil surface lowers with respect to the bottom surface 11 when a certain amount of period has passed after the work machine stops. This allows the avoiding the oil to drip when the filter element 20 is extracted.

According to the present embodiment, when the flow rate of the hydraulic oil increases, the air inside the case 10 can be avoided to be discharged from the outflow portion 50B. Consequently, it is possible to avoid bubbles to be generated in the hydraulic oil stored in the tank 100.

When bubbles are contained in the hydraulic oil stored in the tank 100, the bubbles pass through the suction strainer 9 (see FIG. 1) and flow into the pump to generate an erosion, possibly shortening a lifespan of the pump. In the present embodiment, the air in the case 10 is discharged via the flow path 35A particularly when the flow rate of the hydraulic oil is small, so, for example, the occurrence of erosion can be reduced.

In addition, according to the present embodiment, by providing the back pressure valve 52 and the check valve 65, the backflow of the hydraulic oil inside the case 10 to the tank 100 via the flow path 35A during the operation of the engine can be reduced. In particular, providing the check valve 53 avoids the hydraulic oil to flow out from the check valve 53 when the flow rate of the hydraulic oil increases, and this makes it possible to reduce the generation of bubbles in the hydraulic oil.

Note that while in the present embodiment, the falling of the moving member 533 by its own weight causes the check valve 53 to enter the open state from the closed state, the elastic member may assist the movement of the moving member 533. FIGS. 12A and 12B are drawings illustrating an overview of a check valve 53A according to a modification, FIG. 12A is its vertical cross-sectional view, and FIG. 12B is a cross-sectional view taken along the line C-C in FIG. 12A. In FIGS. 12A and 12B, hatching for indicating a cross section is partly omitted.

The check valve 53A mainly includes the tubular case 531, an upper end member 532A, a moving member 533A, the tube-shaped portion 534 (illustration is omitted), and an elastic member 535.

The tubular case 531, the upper end member 532A attached to an upper end of the tubular case 531, and the tube-shaped portion 534 constitute a valve case. One end of the elastic member 535 is provided on the upper end member 532A. The other end of the elastic member 535 is provided on the moving member 533A. The elastic member 535 biases a force in the −z direction to the moving member 533A.

When the hydraulic oil pushes up the moving member 533A against the biasing force from the elastic member 535, the check valve 53A enters the closed state. When the flow rate of the hydraulic oil decreases, the elastic member 535 pushes down the moving member 533A, thereby causing the check valve 53A to enter the open state.

According to this modification, changing the biasing force given by the elastic member 535 (for example, a spring constant of the elastic member 535) facilitates adjustment of the flow rate to open and close the check valve 53A.

Fourth Embodiment

The fourth embodiment of the present invention is a configuration in which a tubular portion is provided inside the inner tube 23. Below, a description is given of a return filter 4 according to the fourth embodiment. Note that the same components as those in the first to third embodiments are denoted by the same reference numerals, and descriptions thereof will be omitted.

FIG. 13 is a cross-sectional view illustrating an overview of the return filter 4. In FIG. 13, hatching for indicating a cross section is omitted. The return filter 4 mainly includes a case 10A, the filter element 20, the lid body 30, the inflow portion 40 (illustration is omitted), and the outflow portion 50B (illustration is omitted except for the cylindrical portion 51A).

The case 10A mainly includes a bottom surface 11A, the mounting member 12, and tubular portions 13 and 14A. The tubular portion 14A includes a tubular portion 14a provided outside the bottom surface 11A, and a tubular portion 14b provided inside the bottom surface 11A. The tubular portion 14a and the tubular portion 14b are provided substantially in parallel.

The tubular portion 14a is provided on a lower side of the tubular portion 13 and has a diameter smaller than a diameter of the tubular portion 13. The tubular portion 14b is provided inside the filter element 20 (inner tube 23) and has a diameter smaller than a diameter of the inner tube 23. In addition, the tubular portion 14b has a height lower than heights of the filter medium 21 and the inner tube 23. A lower end of the tubular portion 14b is positioned downward with respect to lower ends of the filter medium 21 and the inner tube 23.

Drain holes 14c are provided in a position in the vicinity of the lower end of the tubular portion 14b, that is, adjacent to the plate-like portion 22a of the tubular portion 14b.

Next, the functionality of the return filter 4 thus configured will be described. The dash-dotted line arrows in FIG. 13 indicate a flow of the hydraulic oil.

For example, after the work machine starts driving, the hydraulic oil flowing into the space S1 flows from the outside to the inside of the filter medium 21, and the filter medium 21 removes, for example, dust in the hydraulic oil. The hydraulic oil after filtration flows out to the space S2. The hydraulic oil flows into the spaces S1 and S2 so that the initial air is discharged via the flow path 35. Because the tubular portion 14b is provided inside the inner tube 23, the initial air easily flows upward and the initial air can be effectively removed.

In addition, because the tubular portion 14b is provided inside the inner tube 23, when the hydraulic oil flowing into the space S1 flows into the space S2, the hydraulic oil flows upward (in the +z direction) and is guided to the upper portion of the filter medium 21. As a result, a filtration area of the filter medium 21 can be effectively used.

When the work machine stops, the hydraulic oil flows out via the check valve 53. In addition, because the drain holes 14c are provided in the vicinity of the lower end of the tubular portion 14b, the hydraulic oil present outside the tubular portion 14b flows out to the space S2 via the drain holes 14c. Furthermore, the air flows from the space S3 into the spaces S1 and S2 through the flow path 35. Thus, the oil surface in the case 10A gradually lowers.

According to the present embodiment, the hydraulic oil easily flows upward by the tubular portion 14b, so the filtration area of the filter medium 21 can be effectively used. In addition, since the air easily flows upward by the tubular portion 14b, the initial air can be effectively removed.

Note that while in the present embodiment, the tubular portion 14b is integrated with the bottom surface 11A, the tubular portion 14b and the bottom surface 11A may be separate members. For example, the bottom surface 11A and the tubular portion 14b may be separate members, and the tubular portion 14b may be inserted from a lower side of the case 10A to join the bottom surface 11A and the tubular portion 14b together.

In addition, while in the present embodiment, the tubular portion 14b provided on the case 10A side is provided, the tubular portion may be provided on the filter element side. FIG. 14 is a cross-sectional view illustrating an overview of a return filter 4A according to a modification. In FIG. 14, hatching for indicating a cross section is omitted. Note that the same components as those in the first to third embodiments are denoted by the same reference numerals, and descriptions thereof will be omitted.

The return filter 4A mainly includes the case 10, a filter element 20A, the lid body 30, the inflow portion 40 (illustration is omitted), and the outflow portion 50B (illustration is omitted except for the cylindrical portion 51A). The filter element 20A mainly includes the filter medium 21, an outer tube portion 22C, the inner tube 23, the plate 24, and a tubular portion 26.

The outer tube portion 22C mainly includes a plate-like portion 22f having a substantially circular plate shape provided along a lower end surface of the filter medium 21, and tubular portions 22b and 22c outside the filter medium 21 provided substantially parallel to the filter medium 21. The plate-like portion 22f is a substantially circular plate-shaped member having the central portion thicker than its peripheral edge portion. A difference between the plate-like portion 22f and the plate-like portion 22a is only diameters of outer circumferential surfaces of the central portions. The plate-like portion 22f is integrated with the filter medium 21 and the tubular portion 26. In other words, a lower end of the tubular portion 26 is positioned at substantially the same height as the lower ends of the filter medium 21 and the inner tube 23.

The tubular portion 26 is provided inside the inner tube 23 and has a diameter smaller than the diameter of the inner tube 23. In addition, the tubular portion 26 has a height lower than the heights of the filter medium 21 and the inner tube 23. Drain holes 26a are provided in a position in the vicinity of the lower end of the tubular portion 26, that is, adjacent to the plate-like portion 22f of the tubular portion 26.

With the return filter 4A, because the tubular portion 26 is provided inside the inner tube 23, when the hydraulic oil flowing into the space S1 flows into the space S2, the hydraulic oil flows upward (in the +z direction) and is guided to the upper portion of the filter medium 21. As a result, the filtration area of the filter medium 21 can be effectively used. In addition, since the air easily flows upward by the tubular portion 26, the initial air can be effectively removed. Furthermore, because the drain holes 26a are provided, while the work machine stops, the hydraulic oil present outside the tubular portion 26 can be discharged via the drain holes 26a, and the oil surface in the case 10 can be lowered.

Note that while the return filter 4 or 4A includes the outflow portion 50B, the outflow portion 50B is not essential. The return filter 4 or 4A may include the outflow portion 50 or may include the outflow portion 50A.

The embodiments of the invention are described above in detail with reference to the drawings. Specific configurations are not limited to the embodiments and also include changes in the design or the like within a scope that does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

In addition, the term "substantially" is not to be understood as merely being strictly the same, and is a concept that includes errors and modifications to an extent that does not result in loss in identity. For example, the "substantially cylindrical shape" is a concept that includes a case where, for example, the shape can be placed in the same category as the cylindrical shape, and is not strictly limited to the cylindrical shape. Further, simple expressions such as orthogonal, parallel, and identical are not to be understood as merely being strictly, for example, orthogonal, parallel, and identical, and include being, for example, substantially parallel, substantially orthogonal, and substantially identical.

In addition, the term "vicinity" means to include a range of regions (which can be determined as desired) near a position serving as a reference. For example, the term "a vicinity of an end" refers to a range of regions vicinity the end, and is a concept indicating that the end may or needs not be included.

REFERENCE SIGNS LIST 1, 2, 3, 4, 4A Return filter
9 Suction strainer
10, 10A Case
11, 11A Bottom surface
12 Mounting member
13, 14, 14A Tubular portion
14a, 14b Tubular portion
14c Drain hole
20, 20A Filter element
21 Filter medium
22, 22A, 22B, 22C Outer tube portion
22a, 22f Plate-like portion
22b, 22b-1, 22b-2 Tubular portion
22c, 22c-1 Tubular portion
22d, 22e Hole
23 Inner tube
24, 25 Plate
24a Plate-like portion
24b, 24c Tubular portion
26 Tubular portion
26a Drain hole
30 Lid body
31 Flange portion
31a Hole
31b Hole 32 Cover
32a, 32b Hole
33, 33A Mounting portion
33a, 33b, 33c, 33d, 33e Hole
33f Protrusion
33g Recessed portion
33h Positioning portion
35, 35A Flow path
40 Inflow portion
50, 50A, 50B Outflow portion
51, 51A Cylindrical portion
51a, 51h First cylindrical portion
51b, 51i Second cylindrical portion
51c Bottom surface
51d, 51e, 51k Outflow hole
51j Bottom surface
52, 52A Back pressure valve
52a, 52d Valve body
52b Elastic member
52c, 52e Valve seat
53, 53A Check valve
61, 62 Sealing member
63 Indicator
64 Valve
65 Check valve
100 Tank
101 Bottom surface
102 Top surface
102a Opening
102b Hole
103 Side surface
104 Mounting plate
104a Through-hole
104b Hole
105 Partition plate
110 Return filter
111 Case
112 Lid
113 Filter element
531 Tubular case
531a Hole
531b Female screw portion
531c Positioning portion
531d Recessed portion
531e Protrusion
532, 532A Upper end member
532a Hole
532b Male screw portion
532c Valve seat
533, 533A Moving member
534 Tube-shaped portion
535 Elastic member
651 Rod-like member
651a Hole
652 Moving member
652a Tubular hole
651b Hole

The invention claimed is:

1. A filter device, comprising:
a case having a bottomed tubular shape with an open upper end;
a filter element having a cylindrical shape provided inside the case, the filter element including a filter medium having a cylindrical shape, an outer tube portion, and an upper plate, the outer tube portion including a plate-like portion and a tubular portion, the plate-like portion having a circular plate shape and being provided along a lower end surface of the filter medium, the tubular portion being provided outside the filter medium to be parallel to the filter medium, the upper plate having a part with a circular plate shape and being provided so as to cover upper end surfaces of the filter medium and the outer tube portion;
a lid body provided on the case and the upper plate so as to cover an upper end of the case;
an inflow portion that communicates between a space inside the case and outside the filter element and a space outside the case; and
an outflow portion that communicates between a space inside the filter element and the space outside the case, the outflow portion being provided so as to penetrate a bottom surface of the case, wherein
the lid body has a first hole communicating between a space inside the case and the space outside the case,
the outflow portion includes a cylindrical portion having a bottomed cylindrical shape and a back pressure valve provided inside the cylindrical portion,
the back pressure valve includes a valve body having a plate shape, a first elastic member, and a first valve seat, the first elastic member is provided between a bottom surface of the cylindrical portion and the valve body, and the first valve seat is provided on the cylindrical portion,
the cylindrical portion includes a first cylindrical portion and a second cylindrical portion, a top end of the second cylindrical portion being disposed below a bottom end of the first cylindrical portion,
the first valve seat is provided between the bottom end of the first cylindrical portion and the top end of the second cylindrical portion,
the first cylindrical portion has a first through-hole in a side surface of the first cylindrical portion, and the first through-hole communicates between the space inside the filter element and the space outside the case,
the second cylindrical portion has a second through-hole on a side surface of the second cylindrical portion, and
when the valve body does not abut the first valve seat, the space inside the filter element communicates with the space outside the case via the second through-hole.

2. The filter device according to claim 1, wherein
the first hole internally includes a first check valve, the first check valve includes a rod-shaped member and a moving member, the rod-shaped member has a tubular shape and is provided along a vertical direction, the moving member has a tubular hole into which the rod-shaped member is inserted, and the moving member moves along the rod-shaped member by sliding of the tubular hole along the rod-shaped member,
the rod-shaped member is hollow, having a first and second end where the first and second ends are closed, and the rod-shaped member has a second hole and a third hole in a side surface of the rod-shaped member,
the moving member is movably provided between a first position and a second position, the moving member does not cover the second hole or the third hole at the first position, and the moving member covers the second hole at the second position, and
the moving member is movable from the second position to the first position by its own weight.

3. The filter device according to claim 2, wherein
the first cylindrical portion has a first through-hole in a side surface of the first cylindrical portion, and the first through-hole communicates between the space inside the filter element and the space outside the case.

4. The filter device according to claim 3, wherein
the filter element includes an inner tube provided inside the filter medium,
the case or the filter element includes a tubular member provided inside the filter medium,
the tubular member has a lower end positioned at a same height as a lower end of the filter medium or a lower side with respect to the lower end of the filter medium, and
the tubular member has a diameter smaller than a diameter of the inner tube, and the tubular member has a height lower than heights of the inner tube and the filter medium.

5. The filter device according to claim 2, comprising
a second check valve provided on a side surface of the first cylindrical portion, wherein
the second check valve includes a valve case, a second valve seat, and a second moving member, a flow path is formed inside the valve case, the second valve seat is provided inside the valve case, and the second moving member is movably provided inside the valve case,
the flow path communicates with a space inside the first cylindrical portion,
a part of the flow path where the second moving member is internally provided has a central axis identical to a vertical direction,
a state where the second moving member moves upward in the vertical direction and the second moving member abuts on the second valve seat is a closed state where the second check valve is closed, and
when the second moving member moves downward in the vertical direction from the closed state by its own weight, the second check valve enters an open state where the second moving member is free from the abutment with the second valve seat.

6. The filter device according to claim 5, wherein
the filter element includes an inner tube provided inside the filter medium,
the case or the filter element includes a tubular member provided inside the filter medium,
the tubular member has a lower end positioned at a same height as a lower end of the filter medium or a lower side with respect to the lower end of the filter medium, and
the tubular member has a diameter smaller than a diameter of the inner tube, and the tubular member has a height lower than heights of the inner tube and the filter medium.

7. The filter device according to claim 2, wherein
the filter element includes an inner tube provided inside the filter medium,
the case or the filter element includes a tubular member provided inside the filter medium,
the tubular member has a lower end positioned at a same height as a lower end of the filter medium or a lower side with respect to the lower end of the filter medium, and
the tubular member has a diameter smaller than a diameter of the inner tube, and the tubular member has a height lower than heights of the inner tube and the filter medium.

8. The filter device according to claim 1, wherein
the filter element includes an inner tube provided inside the filter medium,
the case or the filter element includes a tubular member provided inside the filter medium,
the tubular member has a lower end positioned at a same height as a lower end of the filter medium or a lower side with respect to the lower end of the filter medium, and
the tubular member has a diameter smaller than a diameter of the inner tube, and the tubular member has a height lower than heights of the inner tube and the filter medium.

9. The filter device according to claim 8, wherein
the tubular member has a drain hole adjacent to the plate-like portion.

10. A filter device, comprising:
a case having a bottomed tubular shape with an open upper end;
a filter element having a cylindrical shape provided inside the case, the filter element including a filter medium having a cylindrical shape, an outer tube portion, and an upper plate, the outer tube portion including a plate-like portion and a tubular portion, the plate-like portion having a circular plate shape and being provided along a lower end surface of the filter medium, the tubular portion being provided outside the filter medium to be parallel to the filter medium, the upper plate having a part with a circular plate shape and being provided so as to cover upper end surfaces of the filter medium and the outer tube portion;
a lid body provided on the case and the upper plate so as to cover an upper end of the case;
an inflow portion that communicates between a space inside the case and outside the filter element and a space outside the case; and
an outflow portion that communicates between a space inside the filter element and the space outside the case, the outflow portion being provided so as to penetrate a bottom surface of the case, wherein
the lid body has a first hole communicating between a space inside the case and the space outside the case,
the outflow portion includes a cylindrical portion having a bottomed cylindrical shape and a back pressure valve provided inside the cylindrical portion,
the back pressure valve includes a valve body having a plate shape, a first elastic member, and a first valve seat, the first elastic member is provided between a bottom surface of the cylindrical portion and the valve body, and the first valve seat is provided on the cylindrical portion,
the cylindrical portion includes a first cylindrical portion and a second cylindrical portion,
the first valve seat is provided between the first cylindrical portion and the second cylindrical portion,
the second cylindrical portion has a second through-hole on a side surface of the second cylindrical portion,
when the valve body does not abut the first valve seat, the space inside the filter element communicates with the space outside the case via the second through-hole, and wherein
the filter device comprises a second check valve provided on a side surface of the first cylindrical portion,
the second check valve includes a valve case, a second valve seat, and a second moving member, a flow path is formed inside the valve case, the second valve seat is provided inside the valve case, and the second moving member is movably provided inside the valve case,
the flow path communicates with a space inside the first cylindrical portion, a part of the flow path where the second moving member is internally provided has a central axis identical to a vertical direction, a state where the second moving member moves upward in the vertical direction and the second moving member abuts on the second valve seat is a closed state where the second check valve is closed, and when the second moving member moves downward in the vertical direction from the closed state by its own weight, the second check valve enters an open state where the second moving member is free from the abutment with the second valve seat.

11. The filter device according to claim 10, wherein the second check valve includes a second elastic member, and the second elastic member biases a force downward in the vertical direction to the second moving member.

12. The filter device according to claim 11, wherein the filter element includes an inner tube provided inside the filter medium, the case or the filter element includes a tubular member provided inside the filter medium, the tubular member has a lower end positioned at a same height as a lower end of the filter medium or a lower side with respect to the lower end of the filter medium, and the tubular member has a diameter smaller than a diameter of the inner tube, and the tubular member has a height lower than heights of the inner tube and the filter medium.

13. The filter device according to claim 10, wherein the filter element includes an inner tube provided inside the filter medium, the case or the filter element includes a tubular member provided inside the filter medium, the tubular member has a lower end positioned at a same height as a lower end of the filter medium or a lower side with respect to the lower end of the filter medium, and the tubular member has a diameter smaller than a diameter of the inner tube, and the tubular member has a height lower than heights of the inner tube and the filter medium.

14. The filter device according to claim 10, wherein the first hole internally includes a first check valve, the first check valve includes a rod-shaped member and a moving member, the rod-shaped member has a tubular shape and is provided along a vertical direction, the moving member has a tubular hole into which the rod-shaped member is inserted, and the moving member moves along the rod-shaped member by sliding of the tubular hole along the rod-shaped member, the rod-shaped member is hollow, having a first and second end where the first and second ends are closed, and the rod-shaped member has a second hole and a third hole in a side surface of the rod-shaped member, the moving member is movably provided between a first position and a second position, the moving member does not cover the second hole or the third hole at the first position, and the moving member covers the second hole at the second position, and the moving member is movable from the second position to the first position by its own weight.

15. The filter device according to claim 10, wherein the first cylindrical portion has a first through-hole in a side surface of the first cylindrical portion, and the first through-hole communicates between the space inside the filter element and the space outside the case.

* * * * *